US 8,866,618 B2

(12) United States Patent
Cotten et al.

(10) Patent No.: US 8,866,618 B2
(45) Date of Patent: Oct. 21, 2014

(54) MINE PERSONNEL CARRIER INTEGRATED INFORMATION DISPLAY

(75) Inventors: Steven A. Cotten, Dumfries, VA (US);
Aaron A. Renner, Washington, DC (US); Luis B. Giraldo, Fairfax, VA (US)

(73) Assignee: Raytheon Company, Waltham, MA (US)

( * ) Notice: Subject to any disclaimer, the term of this patent is extended or adjusted under 35 U.S.C. 154(b) by 461 days.

(21) Appl. No.: 13/152,047

(22) Filed: Jun. 2, 2011

(65) Prior Publication Data

US 2012/0001743 A1 Jan. 5, 2012

Related U.S. Application Data

(60) Provisional application No. 61/361,394, filed on Jul. 3, 2010.

(51) Int. Cl.
*G08B 23/00* (2006.01)
*B62D 33/00* (2006.01)

(52) U.S. Cl.
USPC .............. 340/573.1; 340/539.22; 340/539.26; 296/63

(58) Field of Classification Search
USPC ............... 340/438, 517, 539.13, 539.26, 600, 340/603, 632, 633, 634, 539.22, 573.1, 340/573.4; 128/200.24, 200.28, 202.27, 128/4.18, 204.21, 204.24, 205.26, 205.28; 422/120, 186.03; 296/63, 178; 454/168; 299/12, 95; 702/182, 188; 703/8; 705/62.1; 345/7, 8, 102
See application file for complete search history.

(56) References Cited

U.S. PATENT DOCUMENTS

| 4,162,099 | A | * | 7/1979 | Schopf ............................ 296/63 |
| 4,249,768 | A | * | 2/1981 | Bell ................................ 296/63 |
| 4,718,352 | A | * | 1/1988 | Theurer et al. ................ 105/62.1 |
| 4,815,363 | A | * | 3/1989 | Harvey .......................... 454/168 |
| 6,683,584 | B2 | * | 1/2004 | Ronzani et al. .................... 345/8 |
| 7,181,370 | B2 | * | 2/2007 | Furem et al. ................... 702/188 |

(Continued)

FOREIGN PATENT DOCUMENTS

WO  WO 2005/072827   8/2005
WO  WO 2008/148222  12/2008

OTHER PUBLICATIONS

PCT/US2011/041060; filed Jun. 20, 2011; Raytheon Company (Steve A. Cotton); international search report dated Nov. 12, 2012.

(Continued)

*Primary Examiner* — Van T. Trieu
(74) *Attorney, Agent, or Firm* — Thorpe North & Western LLP

(57) ABSTRACT

In certain embodiments, a mine personnel carrier includes an integrated information display and one or more processing units. The processing units may access life support data from devices associated with a life support subsystem of a mine personnel carrier. The life support subsystem provides breathable air to passengers of the mine personnel carrier, and the life support data indicates a remaining level of air available via at least a portion of the life support subsystem. The processing units access guidance data from guidance devices associated with a guidance subsystem of the mine personnel carrier. Each guidance device can detect entities within a detection range of the guidance device. The processing units initiate display in the integrated information display of at least a portion of the life support data and the guidance data. The integrated information display comprises a unified electronic display of the mine personnel carrier.

24 Claims, 5 Drawing Sheets

(56) References Cited

U.S. PATENT DOCUMENTS

| | | | |
|---|---|---|---|
| 7,310,072 B2* | 12/2007 | Ronzani et al. | 345/8 |
| 7,406,399 B2* | 7/2008 | Furem et al. | 702/182 |
| 7,533,942 B2* | 5/2009 | Kennedy et al. | 299/12 |
| 7,538,666 B2* | 5/2009 | Campman | 340/539.13 |
| 7,673,629 B2* | 3/2010 | Turiello | 128/204.21 |
| 7,677,247 B2* | 3/2010 | Turiello | 128/205.26 |
| 8,381,726 B2* | 2/2013 | Turiello | 128/205.26 |
| 8,413,653 B2* | 4/2013 | Turiello | 128/204.21 |
| 2010/0141418 A1 | 6/2010 | Feroldi | |
| 2011/0029241 A1* | 2/2011 | Miller et al. | 701/220 |

OTHER PUBLICATIONS

Stewart L. Bell, *Modifications to Underground Coal Mine Personnel Transport Vehicles for Mine Rescue Duties*, 30th Int'l Conf. of Safety in Mines Research Institutes, South African Institute of Mining and Metallurgy, 2003, pp. 441-460.

Queensland Mining Industry Health & Safety Conference 2005, Conference Proceedings, Aug. 14-17, 2005 (195 pgs).

Shairzal, *Breathing Air System for Escape Vehicles*; Website: http://www.shairzal.com.au (2 pgs), last printed Jun. 10, 2010.

Report: Ray Davis, Simtars (Safety in Mines Testing and Research Station), *Mines Rescue/Self Escape Vehicle*, Website: www.simatrs.qld.gov.au, simatars@dme.qld.gov.au (1 pg), last printed Jun. 10, 2010.

S. Cotton, A. Dennison-Johnson, L. Giraldo, A. Renner, K. Rouleau, *Mine Escape Vehicle (MEV) Concept Development* (6 pgs), Feb. 2010.

Raytheon—*Mine Escape Vehicle (MEV) Concept Development*, Contract No. 200-2008-24826, Final Report delivered Mar. 12, 2009 (77 pgs), Jun. 2009.

S. Cotton, A. Dennison-Hohnsn, L. Giraldo, A. Renner, K. Rouleau, NIOSH—*Mine Escape Vehicle (MEV) Concept Development*, SME 2010 Annual Meeting, Phoenix, AZ (15 pgs), Mar. 3, 2010.

* cited by examiner

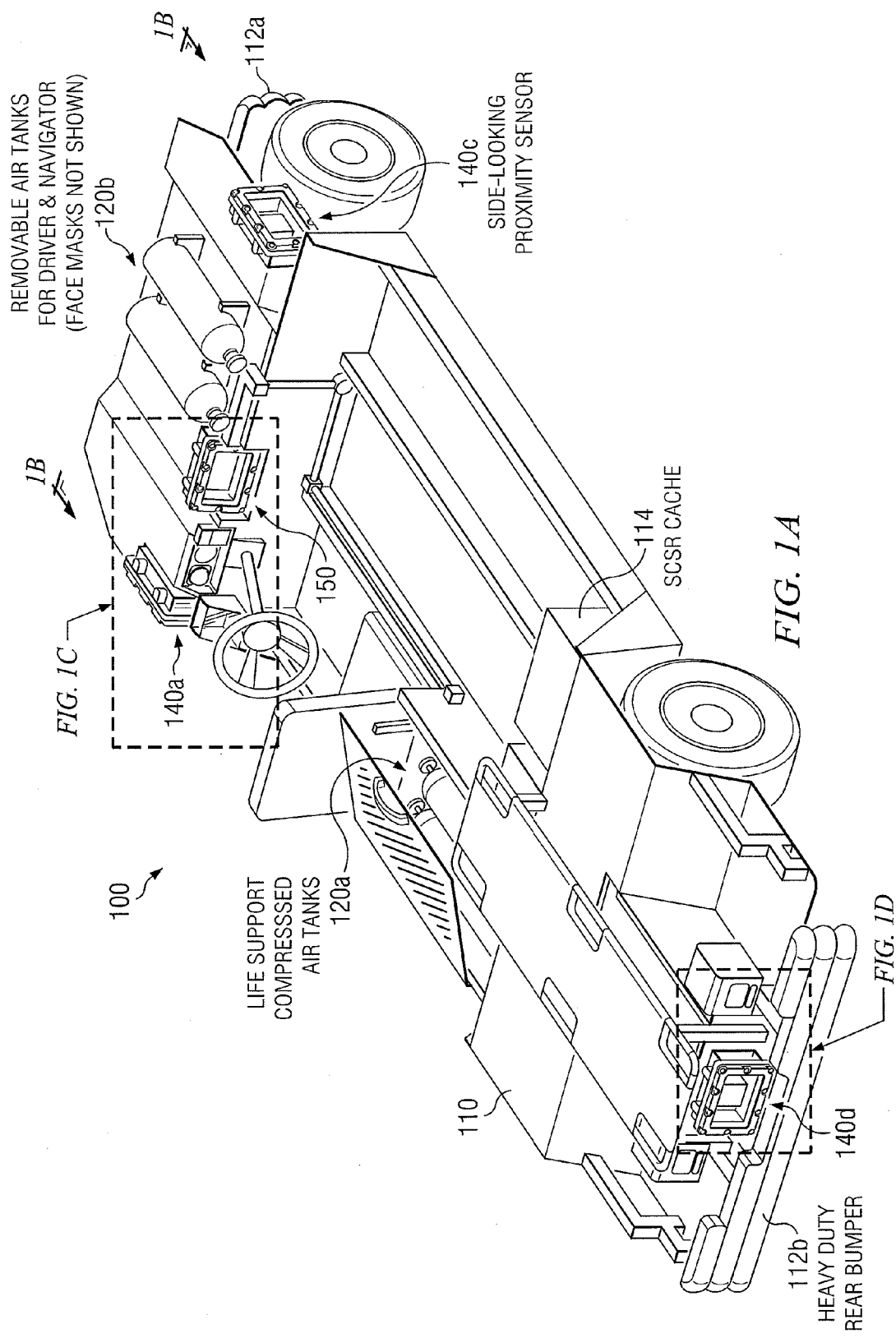

ated source for a vehicle operator (or other suitable passenger) to obtain information. Principal causes of death in mining accidents often include polluted atmospheres and an inability of mine personnel to escape dangerous areas of the mine. The centralized nature of embodiments of the integrated information display may be particularly beneficial in an emergency situation when response time is critical, visibility may be impaired, and other distractions may exist. The integrated information display of certain embodiments of the present disclosure may provide a more efficient way for miners to gather information pertinent to escaping either the mine or a dangerous area of a mine in an easier manner. In certain embodiments, the integrated information display may be brightly illuminated such that it remains visible even in conditions of low- or no-visibility, which may be present in a mine subsequent to and/or during a disaster. Miners often experience post-incident mental stresses, potentially including panic and disorientation, which may impact the miners' abilities to interact with complex and scattered equipment. Providing a single, unified electronic display can help minimize the impact of these emotional factors on the miner's performance in escaping a dangerous area of the mine.

MINE PERSONNEL CARRIER INTEGRATED INFORMATION DISPLAY

RELATED APPLICATION

This application claims the benefit under 35 U.S.C. §119(e) of the priority of U.S. Provisional Application Ser. No. 61/361,394, filed Jul. 3, 2010, entitled "Mine Personnel Carrier Integrated Information Display," incorporated herein by reference in its entirety.

GOVERNMENT RIGHTS

A portion or all of this disclosure may have been made with Government support via U.S. Government Contract No. 200-2008-24826, awarded by the Center for Disease Control and Prevention (CDC)—National Institute for Occupational Safety and Health (NIOSH). The Government may have certain rights in this disclosure.

BACKGROUND

Mine personnel (e.g., coal miners) typically use mine personnel carriers (e.g., vehicles) to transport mine personnel throughout the mine. Mines are susceptible to dangers such as explosions and fires, which often put the lives of mine personnel at risk. Given the confined nature of the mine environment, these dangers may be heightened. For example, post-incident conditions may include high concentrations of dangerous gases and low concentrations of breathable air, low or no visibility due to smoke or dust particles, entry obstructions such as downed over-casts and stopping materials, lack of communications caused by an explosion or fire, and atmospheres that can potentially foster secondary explosions/fires.

SUMMARY

According to the present disclosure, disadvantages and problems associated with previous mine personnel carriers may be reduced or eliminated.

In certain embodiments, a mine personnel carrier includes an integrated information display and one or more processing units. The processing units may access life support data from devices associated with a life support subsystem of a mine personnel carrier. The life support subsystem provides breathable air to passengers of the mine personnel carrier, and the life support data indicates a remaining level of air available via at least a portion of the life support subsystem. The processing units access guidance data from guidance devices associated with a guidance subsystem of the mine personnel carrier. Each guidance device can detect entities within a detection range of the guidance device. The processing units initiate display in the integrated information display of at least a portion of the life support data and the guidance data. The integrated information display comprises a unified electronic display of the mine personnel carrier.

Particular embodiments of the present disclosure may provide one or more technical advantages. As described above, post-incident conditions in a mine may include high carbon monoxide (CO), carbon dioxide ($CO_2$), methane ($CH_4$), nitric oxide (NO), nitrogen dioxide ($NO_2$) concentrations and low oxygen ($O_2$) concentrations, low- or no-visibility due to smoke or dust particles, entry obstructions such as downed over-casts and stopping materials, lack of communications caused by an explosion or fire, and atmospheres that can potentially foster secondary explosions/fires. In certain embodiments, the mine personnel carrier of the present disclosure includes an ability to counteract or otherwise address one or more of these post-incident conditions. For example, embodiments of the present disclosure provide a mine personnel carrier that includes a number of subsystems each designed to address one or more of these disaster conditions.

In certain embodiments, the mine personnel carrier includes an integrated information display. The integrated information display may provide a centralized Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which:

FIGS. 1A-1D illustrate an example mine personnel carrier, according to certain embodiments of the present disclosure;

DESCRIPTION OF EXAMPLE EMBODIMENTS

Figure 1B:
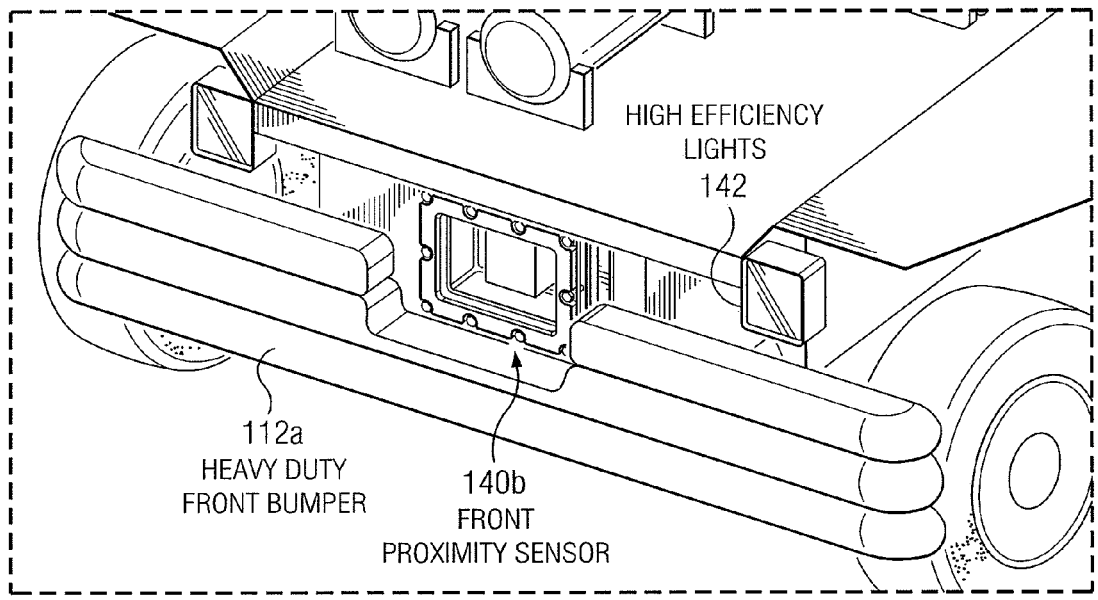
Figure 1C:
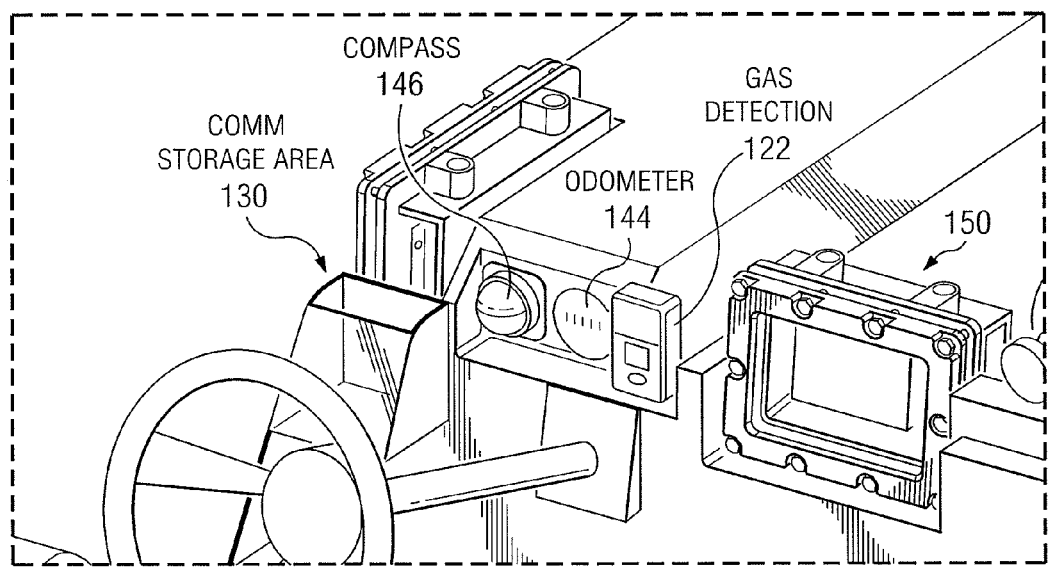
Figure 1D:
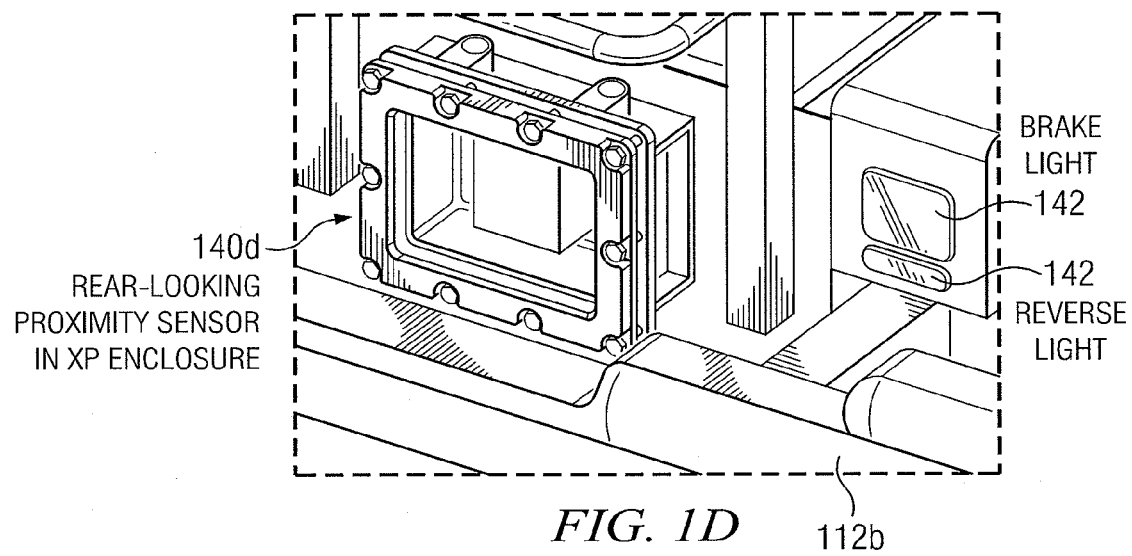

FIGS. 1A-1D illustrates an example mine personnel carrier 100, according to certain embodiments of the present disclosure. Although a particular embodiment of mine personnel carrier 100 is illustrated and primarily described, the present disclosure contemplates any suitable embodiment of mine personnel carrier 100 in accordance with the present disclosure. FIGS. 1B-1C illustrate magnified views of several subsections of mine personnel carrier 100 of FIG. 1A.

In general, mine personnel carrier 100 may assist in the evacuation of mine personnel (e.g., miners) in the event of a mine emergency. Such an evacuation may include relocating to a safer portion of the mine or completely evacuating from the mine. In certain embodiments, mine personnel carrier 100 may include an integrated information display, described in greater detail below, which is operable to display to appropriate personnel who are using mine personnel carrier 100 a variety of information in a unified electronic display.

Conditions subsequent to a mining accident may create a number of obstacles that make escaping the mine (or relocating to a safer portion of the mine) difficult or impossible. For example, thick smoke or dust in the air can cause limited or no visibility. As another example, various poisonous gases may reach hazardous levels. Carbon monoxide (CO) concentration in the mine may be high (e.g., greater than 100 parts per million (ppm)). Carbon dioxide ($CO_2$) and methane ($CH_4$) concentrations each may be high (e.g., each greater than two percent). Oxygen ($O_2$) concentration can be low (e.g., less than sixteen percent). As another example, obstructions may impede miners' abilities to locate a clear path for escape (particularly when coupled with no- or low-visibility conditions). Such obstructions may also block the exit of the mine and may include fallen overcasts, blown out stoppings, roof falls, and other obstacles. As another example, life support units may not provide enough time for escape. As another example, lack of communication between miners in the mine and/or with those outside the mine may be problematic. In certain embodiments, mine personnel carrier 100 may mitigate one or more of these factors and may facilitate more efficient exit of mine personnel from the mine in the case of an emergency, including fire or explosion.

In certain embodiments, mine personnel carrier 100 is useful in the mining environment for purposes other than escaping a mine disaster. For example, regular use of mine personnel carrier 100 in the mine by the miners may provide confidence-building benefits of demonstrating equipment reliability and availability and providing familiarity with operation in time of emergency. It should be noted, however, that regular use also increases the wear-and-tear on the vehicle, which may increase maintenance costs.

Mine personnel carrier 100 may include one or more subsystems that facilitate escape from or relocation within a mine during or subsequent to a mine disaster. In certain embodiments, the subsystems include one or more of the following: a chassis; a life support subsystem; a communication subsystem; a vision/guidance subsystem (referred to throughout the remainder of this description as the guidance system); a navigation subsystem; and/or any other suitable subsystems. In certain embodiments, it may be appropriate for a portion or all of the subsystems (and/or their constituent components) of mine personnel carrier 100 to be approved by the Mine Safety and Health Administration (MSHA). Furthermore, particular design aspects of mine personnel carrier 100 may be determined based on the type of mine in which mine personnel carrier 100 will be used, along with the possible emergency events that mine personnel carrier 100 may be used to escape.

The subsystems of mine personnel carrier 100 described throughout this description are merely example subsystems that may be included with mine personnel carrier 100. The present disclosure contemplates mine personnel carrier 100 including any suitable combination of these and other subsystems, according to particular needs. Additionally, the details of the particular example subsystems described herein are provided for example purposes only.

A first subsystem of mine personnel carrier 100 may be chassis 110. Chassis 110 can be considered the backbone of mine personnel carrier 100 on which the other subsystems of mine personnel carrier 100 may reside. Chassis 110 may be adapted to integrate and support other subsystems of mine personnel carrier 100. For example, other subsystems of mine personnel carrier 100 may be mounted on, carried in, or otherwise supported by chassis 110.

A number of factors may influence selection of an appropriate design for chassis 110. Certain design considerations for chassis 110 may include capacity, size, power plant selection, and range of operation. Although particular design considerations are described, the present disclosure contemplates any suitable design considerations for chassis 110 and mine personnel carrier 100.

Chassis 110 may be designed to support a suitable number of miners. As just one particular example, chassis 110 may support eight to twelve miners, and potentially a suitable number of injured miners (e.g., one miner on a stretcher). Additionally, chassis 110 may be designed to support a suitable amount of cargo, if desired.

Chassis 110 may have any suitable dimensions, according to particular needs. However, the type of mine, dimensions of the mine, and other factors particular to the mine may be appropriate considerations when selecting an appropriate design for chassis 110. In determining the dimensions of chassis 110, it may be beneficial to consider the typical dimensions of the passageways in which mine personnel carrier 100 will be used. For example, it is generally desirable that mine personnel carrier 100, including chassis 110 and other on-board equipment, be sized such that there is adequate room to maneuver mine personnel carrier 100 in the mine. One particular example chassis may be between fourteen and sixteen feet long, six and one-half to eight feet wide, and two and one-half to three feet tall. Other particular factors include the mine type (e.g., longwall or room and pillar), mine height (e.g., high, defined as greater than five feet, or low, defined as less than five feet), mine size (e.g., large, typically defined as those with escape routes longer than two miles, or small, typically defined as those with escape routes shorter than two miles), and/or any other suitable factors. In certain embodiments, chassis 110 may have a range of four to twenty miles and can maintain a speed of three miles-per-hour or greater. Chassis 110 may meet certain ground clearance, wheel base, and fraction requirements, if appropriate.

In certain embodiments, the design of chassis 110 is based on a mantrip, or personnel carrier. A typical mantrip may be used by miners on a day-to-day basis and could be operated by almost any of the miners. Operation of a mantrip is often based on a driving system that is similar to a typical automobile, which likely will be familiar to most if not all of the miners. Chassis 110 may be a rubber tired vehicle, maneuverable in confined spaces. Although chassis 110 is described primarily as being a mantrip, the present disclosure contemplates chassis 110 of mine personnel carrier 100 being of any suitable type. Other example types of chassis may include a scoop, a locomotive, or general haulage equipment. Chassis 110 may include one or more of heavy duty front and rear bumpers 112a and 112b, a winch, enhanced front and rear suspension, and adjustable ground clearance. Chassis 110 may have a dedicated Self-Contained Self Rescuer (SCSR) cache 114 (which may be considered part of the life support subsystem described below) and a first aid kit aboard.

Chassis 110 may be powered in any suitable manner. For example, chassis 110 may be powered using any suitable combination of diesel, fuel cells, battery(ies), or other suitable energy sources (including hybrid power). If appropriate, other subsystems of mine personnel carrier 100 may also draw power from the power source of chassis 110. In the case of a battery, a particular example battery may be a 72V power pack. Factors that may affect the battery life include driving conditions, distance out of the mine, ancillary equipment connected to the battery pack, overall charge, time between charges, and other factors. It may be appropriate to consider these and other factors when selecting the number and type of batteries for mine personnel carrier 100. As described above, chassis 110 may be rail-mounted; however, given that some rail-mounted mining vehicles use a mine-wide power grid for power (which may be shut down or otherwise disabled in the event of a disaster), the rail-mounted embodiment may be less desirable for certain scenarios.

A second subsystem of mine personnel carrier 100 may be the life support subsystem. The life support subsystem may be designed to provide a breathable atmosphere and/or analyze atmospheric conditions in a hostile environment, while evacuating a mine during an emergency such as a fire or explosion for example. As described above, possible conditions encountered during and after a mine disaster may include oxygen deficiency and the presence of combustion by-products, many of them poisonous or asphyxiates. In general, the life support subsystem may include one or more of a compressed air system, re-breather system, and one or more atmospheric analyzers.

The life support subsystem may include a system for providing breathable air to miners. In certain embodiments, the life support subsystem comprises a group life support system integrated into mine personnel carrier 100. Additionally or alternatively, the life support system comprises individual life support devices for each passenger (e.g., according to some predetermined number) stored on mine personnel carrier 100. In the illustrated example, the life support subsystem includes SCSR cache 114 and a number of compressed air tanks 120.

In certain embodiments, an objective is to provide the driver and the navigator of mine personnel carrier 100 with life support units that permit clear vision and voice communication and some or all of the other miners aboard mine personnel carrier 100 with self-rescuer units (which may or may not have voice communication capabilities). In certain embodiments, the life support subsystem may include one or more of the following: a full or partially pressurized cabin of mine personnel carrier 100; vehicle supported individual air supplies; SCSRs; and any other suitable life support equipment.

Two typical groups of life support subsystems are Self Rescuers and Self-Contained Breathing Apparatus (SCBA). Each of these is described in greater detail below.

Typical Self Rescuers are portable, can be used for escaping the mine, provide approximately one hour of breathable air, and include goggles, a nose clip, a mouth piece, and a respirator unit. Example sub-types of Self Rescuers include Filter Self Rescuers (FSRs) and SCSRs. FSRs typically comprise an open circuit breather that is effective primarily for filtering out CO, and use a chemical reaction to convert CO into $CO_2$. A chemical reaction within the canister may convert the CO into nontoxic $CO_2$. Certain FSRs may need at least 16% oxygen in the atmosphere to operate appropriately. FSRs may be used as part of a hybrid breathing system. SCSRs typically comprise a closed-circuit re-breather designed to protect the user against toxic gases, oxygen deficiency, and smoke inhalation. These re-breathing systems often circulate exhaled gases through a $CO_2$ absorption canister and supplement oxygen before returning air to the user. Most SCSRs rely on compressed oxygen or oxygen-generating chemicals such as potassium superoxide. Example SCSR devices include OCENCO EBA 6.5, DRAEGER OXY-K PLUS, OCENCO M-20, CSE SR-100, and MSA LIFE SAVER 60.

Another example system that may be used is a hybrid system that combines both SCSR and FSR capabilities, along with a breathing air monitor designed to maximize breathing time. The oxygen supplied in SCSR mode may be sourced from a compressed gas tank. Additionally, the unit may comprise a specially designed docking valve that allows a user to switch to a new unit without exchanging mouthpieces, maintaining integrity against the intake of hazardous fumes or gases. Mechanical safeties incorporated in the valve design may prevent switching to open atmosphere or detaching a live air supply. The hybrid system may be designed for one-hour duration, with a two-hour unit possible without substantially increasing overall size. The presence of the docking valve presents additional possibilities, allowing the user to connect to an alternate source of breathable air other than a SCSR, such as a central air reservoir on the mine personnel carrier 100 that miners may be able to access.

Another example system that may be used offers proprietary chemistry to generate oxygen and scrub $CO_2$. This system may use a hooded mask and quick disconnect hoses. The hooded mask may help ensure protection while swapping units and may enable communication (e.g., using the communication subsystem). The self-sealing quick-disconnect hoses may block the influx of contaminated external air and allow safe changeover. The hooded mask may take additional space, such that miners carry a larger SCSR unit or one with shorter duration to accommodate the mask. Because SCSRs are closed circuit, a good seal may be important. This seal can be accomplished with an oral-nasal mask that is custom fit for each individual or with a hooded mask that is tight around the neck of the user (but would accommodate users with facial hair).

A microphone/speaker system may be incorporated with the mouthpieces that would allow communication without breaking the mouthpiece seal. An example system uses a bone-induction mouthpiece and a combination short range RF transceiver/voice amplifier.

Life support in relation with mine personnel carrier 100 may be considered in two stages. The first stage may include the life support system that is deployed immediately after the emergency occurs. This may be the SCSR carried by each miner. The second stage may include the life support system employed as miners evacuate using mine personnel carrier 100. If mine personnel carrier 100 includes an integrated life support system, miners may transition between their SCSRs and the integrated air supply of mine personnel carrier 100. To limit potential problems associated with traditional SCSR units, it may be beneficial to include either the hybrid system or the above-described example system that offers proprietary chemistry to generate oxygen and scrub $CO_2$; however, these two systems are described for example purposes only.

Turning to SCBA systems, SCBA systems are generally larger and capable of longer operation relative to SCSRs, and often are used by rescue personnel. SCBAs may include a high-pressure tank (e.g., up to 4500 psi), a pressure regulator, and an inhalator (e.g., mouthpiece, mouth mask, or facemask). The components may mount on a carrying frame. There are two primary groups of SCBA: The re-breathers or Closed Circuit Breathing Apparatus (CCBA), and open circuit breathing sets or Compressed Air Breathing Apparatus (CABA).

CCBA units operate in a manner similar to SCSRs by circulating exhaled gases through filters to remove $CO_2$ and supplementing them with oxygen from the tank. Advantages of these systems include a longer duration in comparison with SCSR systems and the use of facemasks. Facemasks may incorporate a voice device to facilitate communications. Because the systems work under positive pressure, the danger of having contaminants leak inward may be reduced. Disadvantages include their typically large size and high maintenance requirements. Also, because they are closed circuit systems, fogging of the mask may occur. The chemical reaction of the scrubber generates heat that is usually dissipated using ice. Thus, it may be appropriate for ice to be maintained underground if the units are to be used for escape purposes. Some CCBAs use disposable $CO_2$ scrubber cartridges as opposed to granular absorbent. Others use interchangeable ice canisters instead of cylinder-shaped ice blocks for refrigeration. Many models offer a gauge to provide feedback to the user on unit status and oxygen supply level.

CABA breathers generally are filled with filtered compressed air and use regulators to reduce air pressure for normal breathing and to optimize air use. Exhaled air exits the system. CABA breathers generally are open circuit and have a full-face mask, regulator, air cylinder, pressure gauge, and a harness with adjustable shoulder straps. Currently, there are three standard sizes: 30, 45, or 60 minutes. Cylinders may comprise aluminum or steel, or may be of composite construction. Composite cylinders, typically carbon fiber, are the lightest in weight but are more delicate and have a shorter service life span than other types. CABA units are either positive pressure or negative pressure systems. In negative pressure units, air is delivered to the mask when the user inhales, which may reduce the pressure inside the mask to less than the outside pressure. However, leaks in the interface between the mask and face may expose the user to the outside environment. Positive pressure systems generally maintain a slightly higher pressure inside the mask. This higher pressure may be maintained even when the user inhales, and leaks may flow to the outside of the device to prevent contamination. Because they operate as open circuit systems, fogging of the mask typically is not a problem with CABA devices. The use of a mask may also provide various benefits.

Another potential life support system, developed by SHAIRZAL, uses large tanks of compressed air to supply the occupants of a vehicle. Tubes installed inside the vehicle may act as manifolds to distribute air to all occupants. Full-face masks may be installed for all or selected passengers (e.g., for the driver and front passenger). Some passengers may be supplied with an oral-nasal mask that connects to the air manifold. The reservoir tanks may have any suitable size, such as to provide up to 1.2 hours of air for 10 passengers.

The present disclosure also contemplates using oxygen generators, if appropriate. Such oxygen generators may use Pressure Swing Adsorption (PSA) technology to extract oxygen from air and concentrate it at better than 4:1 ratio. An oxygen generator unit of about 22"×17"×34" in size, weighing approximately 140 lbs., may produce approximately 21% oxygen purity at 33 liters per minute with a pressure of 5 psi. The unit may use less than 750 W to operate and may be driven by the chassis electrical power supply of mine personnel carrier 100 or with a direct mechanical link in the case of a diesel power option. Filtering of dust and scrubbing of noxious gases may also be appropriate when using oxygen generators. Advantages of using an oxygen generator include mission duration equivalent to power availability of mine personnel carrier 100. Disadvantages include the size of the system.

As just one particular example, the life support subsystem may include a vehicle-supported breathing system for the driver and navigator and SCSRs for the other vehicle occupants. In a particular example in which the life support system comprises a compressed air system, the compressed air system may be implemented using a cascade breathing air system that provides life support to one or more of mine personnel carrier 100 occupants (e.g., a driver and a navigator). The vehicle-supported system for the driver and navigator of mine personnel carrier 100 may include full face masks with demand flow, and in case of vehicle abandonment, two smaller (e.g., one-hour duration) portable tanks, allowing the full face mask system to remain available. The remaining passengers may continue using the mine-supplied SCSRs. Advantages provided by this life support arrangement may include enhanced vision and communication capabilities for the most critical individuals (e.g., the driver and the navigator) leading the mine evacuation, subsequent reduced stress, and the ready ability of passengers to dismount mine personnel carrier 100 to clear obstacles and/or assist other miners.

Mine personnel carrier 100 may have provisions for storage of SCSR units (at SCSR cache 114, for example). This capability, in conjunction with additional respirator caches in the evacuation route plus equipment with the potential capability to refill air tanks on board mine personnel carrier 100, may provide suitable life support during escape. In certain embodiments, the SCSR system may include docking capabilities and potentially longer duration.

In general, the above-described cascade system may include a number of compressed air cylinders connected in parallel to a manifold with outlet connectors. Typically, the connectors of the manifold are used to charge smaller cylinders but can also attach directly to a facemask through a hose. Components from existing CABA systems such as face masks and accessories are typically, or can be made to be, compatible with the cascade breathing air system.

In certain embodiments, the life support system for mine personnel carrier 100 is a Demand-Flow system. With this approach, air is supplied to the respirator as the wearer inhales or demands air, which may maximize the duration of available air. In order to provide an alternative (e.g., in the event the vehicle is abandoned during escape), a number (e.g., two) of smaller, one-hour duration (or other suitable duration) portable tanks may be included on mine personnel carrier. In this manner, the benefits of using full face mask systems will still be available to suitable miners (e.g., the driver and navigator) even in the event of abandonment of mine personnel carrier 100.

In a particular example, two K-size (60 inches tall×9.25 inches diameter) cylinders at 2400 psi provide approximately 17,000 liters of air. At a consumption rate of 40 liters per minute (lpm), these tanks may provide about 3.5 hours of breathable air for two individuals. A breathing rate of 40 lpm is considered consistent with moderate physical activity. The same size tanks rated for higher pressures may provide additional life support duration if deemed appropriate. This built-in flexibility may allow optimization of life support system performance for a particular mine.

The two additional one-hour duration tanks may allow for additional (i.e., beyond four hours) escape time. These additional tanks may be about 22 inches tall and 7.25 inches diameter and can be mounted in mine personnel carrier 100 using a bracket that would allow removal for dismounted use and for inspection. A harness attached to the tanks may allow the tanks to be carried if appropriate.

In certain embodiments, the air quality expected with a compressed air system is grade D as specified by the American National Standards Institute and the Compressed Gas Association Commodity Specifications as follows:
  $O_2$: 19.5%-23.5%;
  CO: 10 parts per million (ppm) max;
  Oil/hydrocarbon: 5 mg/m3 max;
  $CO_2$: 1000 ppm max; and
  No odor.

In certain embodiments, the breathing system includes pressure-reducing valves, pressure gauges, a relief valve, a low-pressure alarm, in-line check valves, and a distribution manifold. The components may be plumbed together and incorporated into mine personnel carrier 100 in specific locations to make their use practical. A storage box on mine personnel carrier 100 may contain the face mask and hoses to connect to the manifold for use of the breathing system. The complete system may weigh around 600 pounds, including 175 pounds for each large tank and 23 pounds for each of the portable units.

As described above, some SCBA-equipped face masks include speech diaphragms for improved voice communications and intrinsically safe amplifier and radio interface for communications. One issue associated with facemasks is their fit. Masks generally come in three sizes, and one size generally does not fit all. A careful approach in the mask selection may be appropriate to determine the preferable sizes and styles for use in mine personnel carrier 100. However, certain facemasks include a triple seal, making them a three-size-in-one mask, which may be the most practical solution for certain embodiments.

The life support subsystem may include an oxygen generator system that incorporates pre-filtering of dust and scrubbing of noxious intake gases. In certain embodiments, the life support subsystem can support eight-to-twelve people for up to four hours. A portion or all of the life support subsystem may be man portable. In certain embodiments, the life support subsystem can integrate with the communication subsystem.

In certain embodiments, the life support subsystem includes one or more gas detectors 122 or other atmospheric analyzers, which may be operable to analyze atmospheric conditions around mine personnel carrier 100, possibly on a real-time basis, to detect the presence of and/or levels of one or more atmospheric gases. Such atmospheric analyzers may provide miners with knowledge of the presence and/or levels of dangerous gases. Gases that are typically present after a mine fire, explosion, or any other event that triggers ventilation shut down include carbon monoxide and methane. The capability to detect these or other gases and to measure the ambient oxygen level may provide miners valuable information and allow the miners to make informed decisions during evacuation.

As an example, the one or more atmospheric analyzers may detect low levels of $O_2$ or other appropriate gases and/or high levels of CO, $CO_2$, $CH_4$, NO, $NO_2$, and other appropriate gases. The atmospheric analyzer may be portable and/or may cradle with a sampling pump. The atmospheric analyzer may be the same as or in addition to portable atmospheric analyzers carried by the miners. As a particular example, the life support subsystem may include a multi-gas detector with response time of less than ten seconds. In certain embodiments, the atmospheric analyzers are capable of detecting $CH_4$ (e.g., >2%), $O_2$ (e.g., <16%), and CO (e.g., >100 ppm). The atmospheric analyzer(s) may be capable of working in smoke and dust environments. The atmospheric analyzer(s) may have a battery life compatible with established escape time frame. Certain atmospheric analyzers may be operable to store appropriate data. For those atmospheric analyzers that use excessive time to analyze a sample, it may be possible to use a sampling pump to collect air from in front of mine personnel carrier 100 and maintain low speeds when there is indication of rapidly changing atmosphere.

The atmospheric analyzers may have a brightly backlit color display and warning alarm (triggered by appropriate detection levels). They may be configured with a pump and infrared methane sensor. The sampling pump may allow for monitoring gases in front of the vehicle while the infrared sensor is capable of detecting high concentrations of methane in atmospheres void of oxygen. The use of a high-range carbon monoxide sensor capable of detecting carbon monoxide up to 9,999 ppm may provide a suitable mine rescue monitor. Mine personnel carrier 100 may be fitted with a cradle mounted in the dashboard of the vehicle for hands-free operation of the detector. A sampling hose may be installed through the dashboard to collect air samples in front of the vehicle.

Two categories of gas detection instruments approved by the MSHA are methane monitors and methane detectors. Methane monitors are typically machine mounted units used to measure methane levels and generate an alarm or shut down mining equipment when the methane levels reach specific levels. Methane detectors on the other hand are portable units. Some devices include multi-gas sensors and are configurable for simultaneous detection of up to six types of gases.

In certain embodiments, the atmospheric analyzers use a catalytic heat of combustion sensor to detect methane and other gases. These may be reliable for methane concentrations below eight percent and oxygen content above ten percent. Other analyzers may use infrared absorption sensors as an operating method. Infrared analyzers can function without oxygen in a concentration range up to 100% of methane, but because they use an optical approach, the presence of water vapor and dust can cause operating difficulties.

Additional attributes of atmospheric analyzers may include docking capabilities, portability, graphic displays, and/or data logging. For example, a graphic display on the atmospheric analyzer may indicate trends in gas concentrations quickly, which is potentially critical information for escaping miners. Additionally or alternatively, this information may be displayed on integrated information display 150 of mine personnel carrier 100, described below in more detail. Data logging may offer detailed information for mine management and rescue personnel attempting to assess actual mine conditions following the event which prompted use of mine personnel carrier 100 to exit the mine.

A third subsystem of mine personnel carrier 100 may be a communication subsystem. The communication subsystem may allow communication between two or more of the passengers of mine personnel carrier 100. Example communication subsystems may include any suitable combination of radios (e.g., handheld radios), bullhorns or other loudspeakers, and/or any other suitable communication subsystems. The communication subsystem may be used to learn conditions for planning a route out of the mine, to inform personnel outside the mine (e.g., on the surface) of the nature of the emergency and the location of mine personnel carrier 100 (or other appropriate entities in the mine), to communicate with other miners, and/or for any other suitable purpose. In certain embodiments, mine personnel carrier 100 may support and/or be modified to support a variety of types of communications systems (e.g., in a plug-and-play type manner).

The communication subsystem may interface with a mine-wide communication system, which in certain situations may make it appropriate for the communication subsystem to be of the same type as the system installed in the mine. Communication systems in mines may include conventional or upgraded leaky feeder systems, wireless mesh-node networks, and/or other systems. Many mine-wide communication systems may operate as a backbone, with the miners using a standard hand-held radio as their interface. Mine personnel carrier 100 may include a dedicated location 130 for storing the hand-held radios. This may be as simple as a clip on the dashboard or alternatively a small, integrated radio charging station such that the radio may recharge using the vehicle power system.

From an integration standpoint, mine personnel carrier 100 may be configured as a traveling node for a wireless mesh network of the mine. In this embodiment, mine personnel carrier 100 may house one of the mesh nodes on its frame. Typically, the size of such a node is on the order of a standard briefcase and may be housed in a reinforced case.

In certain embodiments, at least a portion of the communication subsystem may integrate with at least a portion of the life support subsystem. For example, the communication subsystem may be integrated within a full-face life support unit mask designed specifically for use in underground coal mines. In certain embodiments, the communication subsystem comprises a vocal cord enhancement sensor, which may be designed for underground mines. This interfacing may allow miners to participate in voice communication while wearing a face mask or other breathing device. As a particular example, the driver and the navigator (and/or any other suitable passengers) of mine personnel carrier 100 may have the ability to communicate with personnel outside the mine (e.g., at the surface) or other personnel in the mine (e.g., underground). The ability to communicate with other miners separated from mine personnel carrier 100 may allow a driver to learn the locations of separated miners and either guide the separated miners to mine personnel carrier 100 or pick up the separated miners.

A fourth subsystem of mine personnel carrier 100 may be a guidance subsystem. In general, the guidance subsystem is operable to detect objects within a range of mine personnel carrier 100 to guide an operator of mine personnel carrier 100 through the mine in a manner that avoids the detected objects (where possible), particularly in low-visibility conditions. The guidance subsystem may also include a display, which in certain embodiments may be a part of integrated information display 150 described below. A portion or all of the guidance subsystem may be man portable, which may be useful in case of vehicle abandonment. The guidance subsystem may integrate with chassis 110 and/or the life support subsystem.

The guidance subsystem can be instrumental in assisting miners escape a dangerous atmosphere during or subsequent to a mining disaster. For example, following an explosion, thick smoke or dust in the air can cause a zero- or limited-visibility environment. The guidance subsystem may operate through smoke, dust, and total darkness, and may allow a driver of mine personnel carrier 100 to better sense and recognize the surroundings under atmospheric conditions with poor visibility. Guidance subsystem components may assist the driver in determining how far the mine personnel carrier 100 is from entities (e.g., humans or other obstacles, such as ribs), which may increase exit speed and decrease the chances of damaging and disabling mine personnel carrier 100. In certain embodiments, guidance system may be able to detect other miners, such as incapacitated or separated miners. This may allow those incapacitated or separated miners to be located even if the mine communications system fails and the whereabouts of those miners remain unknown. In certain embodiments, the guidance subsystem may be able to detect entities three to one-hundred feet from mine personnel carrier 100, at a minimum.

The present disclosure contemplates using any suitable devices for providing the guidance subsystem of mine personnel carrier 100. Certain example guidance subsystems range from highly technical, such as thermal infrared IR cameras and proximity sensors, to fairly basic, such as so-called "curb feelers." These particular examples are described in greater detail below. Furthermore, the present disclosure contemplates using any of these or other example guidance systems in combination, if appropriate.

In certain embodiments, the guidance subsystem may include one or more thermal IR cameras. These IR cameras can generally "see" through heavy smoke, dust, and darkness since they generally rely on temperature to create an image. A video screen (e.g., which may be duplicated in integrated information display 150 described below) may show the operator of mine personnel carrier 100 what is in the camera's field of view. Cameras (e.g., thermal IR cameras) may provide images that require little interpretation by an operator of mine personnel carrier 100. The thermal IR camera may be handheld or fixed to mine personnel carrier 100. If the camera can be removed and used as a handheld device in case of vehicle abandonment, it may provide continued assistance outside of vehicle use. A cradle for holding the IR camera may be positioned at an appropriate location in mine personnel carrier 100 (e.g., on the dashboard). The guidance subsystem may include a material for explosion proof enclosures that is transparent to thermal IR radiation.

In certain embodiments, the guidance subsystem includes one or more proximity sensors 140. Proximity sensors 140 may be positioned around the perimeter of chassis 110 of mine personnel carrier 100 to provide sensing capabilities in a variety of directions. Proximity sensors 140 can act as a "seeing eye dog." These proximity sensors 140 may emit signals for detecting the location of entities around mine personnel carrier 100 and may help an operator of mine personnel carrier 100 keep the carrier 100 near the center of the entry, away from ribs, and may warn of obstacles in the carrier 100's path. Vehicle speed may affect the usefulness and accuracy of proximity sensors 140. In certain embodiments, it may be appropriate for an operator of mine personnel carrier 100 to maintain a slow enough speed to allow proximity sensors 140 to update and warn of entities in the path of mine personnel carrier 100. Some proximity sensors 140 are capable of overlaying the output data onto a video image.

The guidance subsystem may include any suitable types of proximity sensors 140, either alone or in combination. For example, proximity sensors 140 may use one or more of radar, sonar, and Light Detection and Ranging (LIDAR) technology to emit signals. In certain embodiments, proximity sensors 140 use radar technology. For example, proximity sensors 140 may be pulsed radar proximity sensors mounted in explosion proof boxes on various locations (e.g., front, back, and sides) of mine personnel carrier 100.

In certain embodiments, proximity sensors 140 may use LIDAR technology to emit signals. LIDAR may be sensitive to aerosols and other small particles, which may be problematic in a post disaster environment. A specialized variant of LIDAR may be capable of working in conditions of smoke and flame to detect entities through walls of flame. LIDAR is composed of a diode laser transmitter, an ultra-narrowband optical filter, and sensitive imaging camera, and is small enough to be handheld or carried in a backpack. Additionally, while other types of proximity sensors 140 (e.g., those using sonar or ultrasonic sensors that transmit pulsed high-frequency sound waves and detect echoes from nearby objects) are contemplated by the present disclosure, these sensors 140 may be particularly sensitive to particles in the air (e.g., dust) and potentially less desirable for a mine disaster (and post-disaster) environment.

Other technologies that may be used as part of the guidance subsystem may include so-called "curb-feelers," which can be relatively low-cost. For example, by using a mechanical device that extends from the sides of mine personnel carrier 100, a minimum distance from ribs, roof, and/or other suitable locations may be detected when the device hits them. Curb feelers may keep the mine personnel carrier 100 near the middle of the entry, as well as assist the operator in determining the location of crosscuts. Curb feelers may provide an inexpensive guidance option.

The guidance subsystem of mine personnel carrier may include lighting 142. For example, in the case of light smoke or dust in the air, strong lighting 142 on mine personnel carrier 100 may allow the driver to see far ahead to view entities. If obstacles are to be removed from the area by hand, lighting 142 may illuminate the work area. The lighting system may include any suitable types of lights such as LED, halogen, and xenon lighting elements. In addition to helping miners navigate the mine, bright lighting 142 may help miners determine mine personnel carrier 100's location and improve miners' abilities to board the vehicle.

A fifth subsystem of mine personnel carrier 100 may be the navigation subsystem. The navigation subsystem may assist an operator of mine personnel carrier 100 to assess his or her actual location, progress, and escape route options, which may reduce the time it takes to relocate to a safe place within the mine or escape the mine. A display associated with the navigation subsystem may be visible through darkness, smoke, and dust. The navigation subsystem may be able to determine vehicle position, orientation, and location relative to a potential exit. In certain embodiments, the navigation subsystem may include one or more of the following: (1) a compass operable to assist in determining the correct direction toward a mine exit or other suitable location; (2) an odometer to assist the operator of mine personnel carrier 100 in determining distance traveled and approximate location in the mine; (3) navigation software programs that link into and use information from underground tracking and communication systems; and (4) any other suitable systems. The navigation subsystem may interface with the latest mine survey and maps. In certain embodiments, the navigation subsystem is able to duplicate the accuracy of any mine-wide tracking system. Mines often include color-coded reflectors and lifelines to assist miners in orienting themselves in the mine. However, these reflectors and lifelines can be destroyed or covered in dust after a fire or explosion limiting their reflectivity. The navigation subsystem can provide an additional and/or more reliable tool through which the miners may orient themselves within the mine.

In certain embodiments, an analog magnetic compass (or digital compass for which output may be passed to integrated information display 150 described below) may be used to determine the correct direction to a mine exit or other suitable location. While the accuracy of the compass may be affected by underground infrastructure, the compass still should work well enough to indicate the general direction of the mine exits. Extra compasses may be stored on board mine personnel carrier 100 should one break or for miners to take with them if they abandon the vehicle.

In certain embodiments, mine personnel carrier 100 may include an odometer 144, which may not rely on any mine-wide infrastructure to perform it operations. Accuracy in the tens or even hundreds of feet likely would be adequate to help a driver of mine personnel carrier 100 determine distance traveled and approximate location in the mine, particularly if normal landmarks are not visible or have been disrupted by the emergency conditions.

The navigation subsystem may use any other suitable technologies, if available and appropriate to perform navigation operations in the mine environment. Such technologies may include radio frequency identification (RFID), global positioning system (GPS) (should such technology or a variant become operable underground), and/or mesh radio networks.

As a particular example, RFID technology (or other radio-based technology) may be used to track miners and equipment in the mine. These tracking systems may be used to provide information to the navigation subsystem, if the infrastructure remains intact post-event. In certain embodiments, software may display a layout of the mine (e.g., on the below-described integrated information display 150) and the location of miners and equipment. The personnel location and tracking capabilities of these systems may provide information that might assist a driver of mine personnel carrier 100 in finding other miners as well as determine the location of mine personnel carrier 100 as the driver maneuvers out of the mine. In certain embodiments, navigation subsystem comprises software that can link into and use information from underground tracking and communications systems.

In certain embodiments, mine personnel carrier 100 includes an integrated information display 150. Integrated information display 150 may comprise a unified electronic display that is operable to display information associated with the subsystems of mine personnel carrier 100. In certain embodiments, integrated information display 150 combines outputs of sensors or other devices from multiple (and potentially all) subsystems of mine personnel carrier 100 into a single display. The term "integrated information display" may refer to the actual electronic display device, the user interface displayed on the display device, or both. The display may be bright enough to be visible and readable in smoke and dust, which may allow the display to be useable by those aboard mine personnel carrier 100 (particularly a driver and/or navigator of the vehicle) in the aftermath of a disaster in the mine.

While the illustrated embodiment of mine personnel carrier 100 includes an analog compass 146, odometer 144, and gas detector 122 as separate devices on the dashboard apart from integrated information display 150, the present disclosure contemplates one or more of these separate components being removed from or repositioned on mine personnel carrier 100, and the output associated with one or more of these or similar (e.g., digital versions) components being included in integrated information display 150. For example, the analog compass 146 may be removed, a digital compass may be installed, and the output of the digital compass may be displayed on integrated information display 150. Integrated information display 150 is described in greater detail below with reference to FIGS. 2-4.

Although system 100 is illustrated and primarily described as having particular components, the present disclosure contemplates system 100 including any suitable components, according to particular needs. Furthermore, although the components of system 100 are depicted and primarily described as being mounted in a particular location on mine personnel carrier 100, the present disclosure contemplates the components of system 100 being mounted at any suitable location and in any suitable manner, according to particular needs.

The following example scenario is provided for example purposes only. An emergency such as a fire and/or explosion may occur in the mine. Resulting conditions in the mine may include a loss of power and a deteriorating mine atmosphere (e.g., decreasing oxygen levels, heavy smoke and dust). Miners may don and use personal life support equipment such as SCSRs. Miners may locate and gather at mine personnel carrier 100, assess the situation, and prepare to evacuate. Mine personnel carrier 100, including its subsystems, may assist in a rapid and orderly exit. For example, chassis 110 may accommodate seriously injured as well as uninjured miners. As another example, the life support subsystem may supplement personal life support systems (e.g., SCSRs) and be compatible with the communication subsystem. As another example, the guidance subsystem may be used to locate miners, identify and avoid obstacles, detect and avoid fires, and provide improved visibility for navigation. As another example, the communication subsystem may be used to communication with other miners on mine personnel carrier 100, with other miners in the mine (but not on mine personnel carrier 100), and with surface personnel (e.g., as supported by mine-wide communication system). As another example, the navigation subsystem may assist miners in determining orientation, distance traveled, and possibly location within the mine. Mine personnel carrier 100 may negotiate obstructions and/or assist miners in clearing obstructions.

Figure 2:
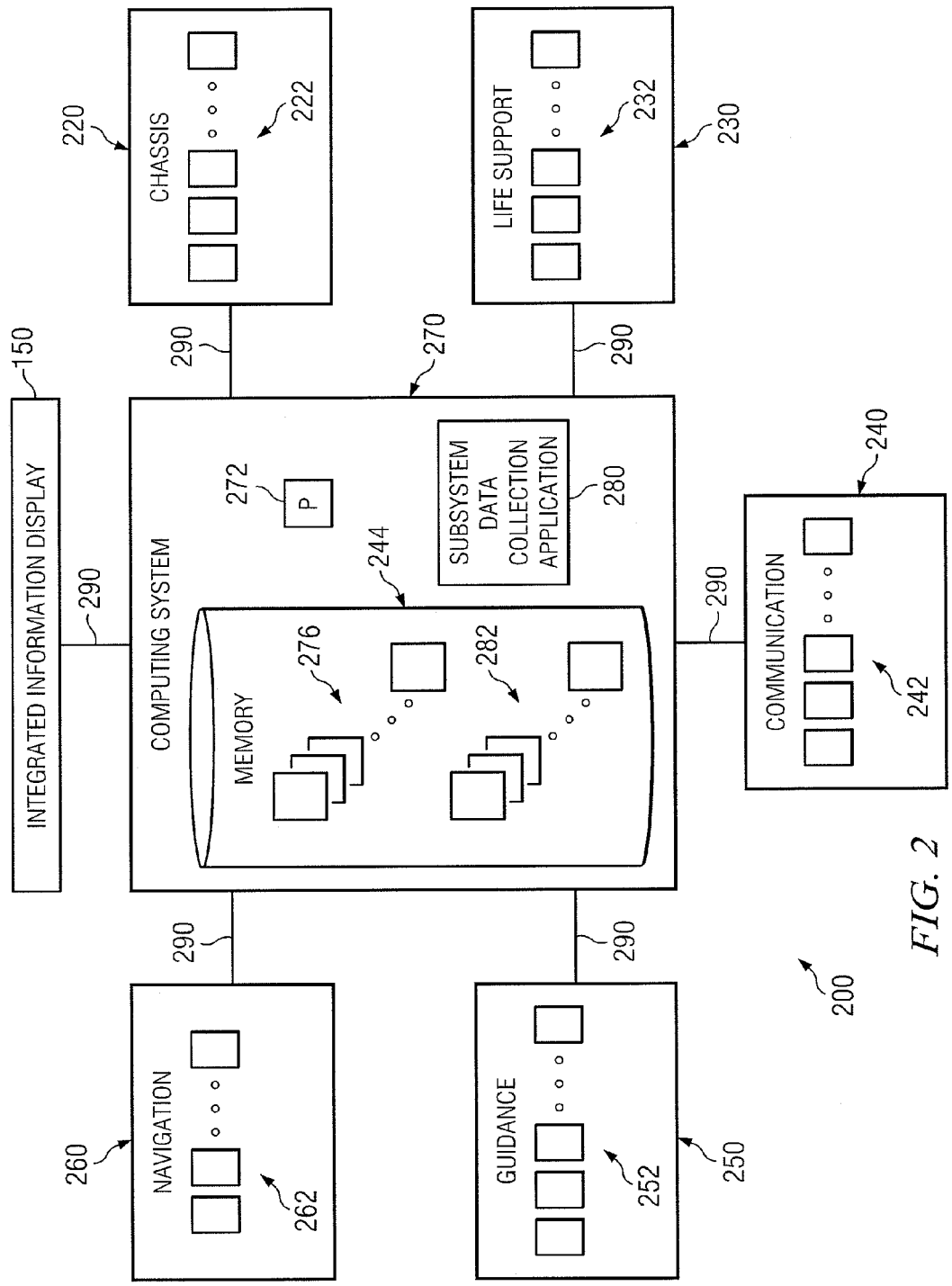
FIG. 2 illustrates an example system for generating an integrated information display for a mine personnel carrier, according to certain embodiments of the present disclosure.

FIG. 2 illustrates an example system 200 for generating an integrated information display 150 of mine personnel carrier 100, according to certain embodiments of the present disclosure. System 200 may be a part of mine personnel carrier 100. In the illustrated example, system 200 includes a portion or all of the subsystems described above with respect to FIGS. 1A-1D; however, the present disclosure contemplates system 200 including different subsystems, if appropriate. These subsystems will be referred to as follows: chassis 220 (which may correspond to chassis 110 of FIGS. 1A-1D); life support subsystem 230; communication subsystem 240; guidance subsystem 250; and navigation subsystem 260. These subsystems may correspond to the subsystems described above with reference to FIGS. 1A-1D. System 200 also may include a computing system 270, along with integrated information display 150. Although the components of system 200 are illustrated primarily as being separate from one another, the present disclosure contemplates system 200 could be integrated or otherwise combined in any suitable manner.

The components of system 200 may be implemented using any suitable combination of software, firmware, and hardware. Software components may be embodied in computer-readable media and when executed be operable to perform appropriate operations. The components of system 200 may be embedded or otherwise attached to mine personnel carrier 100.

Each subsystem may include one or more sensors or other devices for detecting and/or reporting information pertinent to the subsystem. For ease of description, these sensors or other devices will be referred to primarily as sensors throughout the remainder of this description. Particular example sensors are described below with reference to each subsystem. Although a particular number and types of sensors are illustrated and primarily described, the present disclosure contemplates system 200 include any suitable number of appropriate sensors for detecting and/or reporting information associated with their corresponding subsystems. Furthermore, in illustrating the various subsystems, FIG. 2 primarily illustrates example components (e.g., sensors) of the subsystems that are responsible for detecting and/or reporting information related to the subsystem. Certain other components of the subsystems may or may not be illustrated.

Chassis 220 may include one or more sensors 222 for detecting and/or reporting vehicle data associated with mine personnel carrier 100. Vehicle data may include the output of sensors 222. In certain embodiments, the one or more sensors or other devices of chassis 220 may include any suitable combination of power level sensors (e.g., for detecting battery power level), fuel sensors (e.g., for detecting a current fuel level, if appropriate), engine status sensors (e.g., for detecting engine problems), odometers, speedometers, tachometers, oil-level sensors, temperature sensors, tire pressure sensors, and any other suitable devices. Sensors 222 or other devices of chassis 220 may be operable to report a portion or all of the gathered vehicle data to computing system 270 (e.g., to subsystem data collection application 280, described below), possibly for display on integrated information display 150.

Life support subsystem 230 may include one or more sensors 232 for detecting and/or reporting life support data associated with life support subsystem 230. Life support data may include the output of sensors 232. In certain embodiments, sensors 232 of life support subsystem 230 include any suitable combination of breathable air sensors, atmospheric analyzers, and/or any other suitable devices. Sensors 232 of life support subsystem 230 may be operable to report a portion or all of the gathered life support data to computing system 270 (e.g., to subsystem data collection application 280, described below), possibly for display on integrated information display 150.

Breathable air sensors may be able to detect the remaining air supply aboard mine personnel carrier 100 via life support subsystem 230. For example, multiple breathable air sensors may each be associated with a corresponding air supply (e.g., compressed breathable air tank) of life support subsystem 230 of mine personnel carrier 100. Each breathable air sensor may be operable to determine and report the remaining air supply associated with its corresponding air supply.

Atmospheric analyzers may be operable to analyze atmospheric conditions in the mine (e.g., around mine personnel carrier 100) to detect the presence and/or level of one or more atmospheric gases. Atmospheric analyzers may also be referred to as gas detectors. In certain embodiments, atmospheric analyzers are able to detect the presence and/or level of one or more atmospheric gases on a substantially continuous basis. As particular examples, atmospheric analyzers may be operable to detect the presence and/or level of one or more of the following gases: $CO$, $CO_2$, $CH_4$, $NO$, $NO_2$, $O_2$, and other appropriate gases.

Communication subsystem 240 may include one or more sensors 242 for detecting and/or reporting communication data associated with communication subsystem 240. Communication data may include communication status information (e.g., the availability and/or strength of a communication signal), callee identity information (e.g., the identity of a party with whom the miner is connected), or other suitable information regarding communication subsystem 240 that may be useful to a miner aboard mine personnel carrier 100. Sensors 242 of communication subsystem 240 may be operable to report a portion or all of the gathered communication data to computing system 270 (e.g., to subsystem data collection application 280, described below), possibly for display on integrated information display 150.

Guidance subsystem 250 may include one or more guidance devices 252 operable to determine guidance data. Guidance data may include the output of these sensors or other devices. In general, guidance devices 252 are operable to detect entities within a detection range of the devices 252. Guidance devices 252 may include any suitable combination of one or more infrared cameras, one or more proximity sensors (proximity sensors 140), one or more curb feelers, and any other suitable guidance devices. Guidance data for infrared cameras may include infrared images within the detection range of the infrared cameras. Guidance data for proximity sensors may include data identifying detected entities within range of the proximity sensors. Guidance data for curb feelers may include an indication that the curb feeler has contacted an entity. Whether the indication is triggered may depend on the sensitivity setting of the curb feeler. Guidance device 252 of guidance subsystem 250 may be operable to report a portion or all of the gathered guidance data to computing system 270 (e.g., to subsystem data collection application 280, described below), possibly for display on integrated information display 150.

Navigation subsystem 260 may one or more navigation devices 262 operable to detect navigation data. Navigation devices 262 may include any suitable combination of one or more RFID devices, one or more GPS devices, navigation software (e.g., a portion or all of which may be running on computing system 270, described below), a compass, an odometer, and any other suitable navigation devices. Navigation devices 262 may be operable to report a portion or all of the gathered navigation data to computing system 270 (e.g., to subsystem data collection application 280, described below), possibly for display on integrated information display 150.

System 200 includes a computing system 270, which may provide a variety of computing functions for mine personnel carrier 100. For example, computing system 270 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, laptop, workstation, network computer, kiosk, wireless data port, cellular phone, smart phone, personal data assistant (PDA), one or more Internet Protocol (IP) telephones, one or more processors within these or other devices, or any other suitable processing device. Computing system 270 may be located at any suitable location in or on mine personnel carrier 100. As just one example, computing system 270 may be embedded at a suitable location in the dashboard of mine personnel carrier 100.

Computing system 270 may include one or more processing units 272 and one or more memory units 274. Processing units 272 may include one or more microprocessors, controllers, or any other suitable computing devices or resources. Processing units 272 may work, either alone or with other components of system 200, to provide the functionality of system 200 described herein. Memory units 274 may take the form of volatile or non-volatile memory including, without limitation, magnetic media, optical media, random access memory (RAM), read-only memory (ROM), removable media, or any other suitable memory component.

Memory units 274 may store data 276. Data 276 may include data received from the sensors or other devices of the subsystems of system 200 (e.g., chassis 220, life support subsystem 230, communication subsystem 240, guidance subsystem 250, and navigation subsystem 260), including vehicle data, life support data, communication data, guidance data, and navigation data. As described in greater detail below, data 276 may also include information determined based on the data received from the sensors or other devices of the subsystems of system 200.

Computing system 270 may include a subsystem data collection application 280. Subsystem data collection application 280 may be operable to access data determined by or from information determined by the subsystems of system 200, and to initiate display of a portion or all of the information in integrated information display 150. Subsystem data collection application 280 may access data by receiving data (e.g., data communicated by sensors or other devices of the subsystems of system 200), by retrieving data 276 stored in memory units 274 of computing system 270, or by receiving and/or retrieving data in any other suitable manner. In certain embodiments, subsystem data collection application 280 is operable to store (e.g., as data 276 in memory units 274) information received from the subsystems of mine personnel carrier 100 (e.g., from sensors or other devices associated with the subsystems of mine personnel carrier 100) and/or information determined from information received from the subsystems of mine personnel carrier 100.

The data detected and/or recorded by the various subsystems of system 200 may be detected and/or recorded on a substantially continuous basis or at any other suitable time intervals. The devices (e.g., sensors or other suitable devices) of the subsystems may communicate the data to computing system 270 (e.g., to subsystem data collection application 280), and/or the devices (e.g., sensors or other suitable devices) of the subsystems may store the data such that it can be accessed by computing system 270 (e.g., by subsystem data collection application 280).

Subsystem data collection application 280 (or another suitable component of system 200) may be operable to apply one or more algorithms 282 to combine or otherwise analyze data received from the subsystems to provide an operator or other suitable user of mine personnel carrier 100 with other decision-making input. This determined information may also be stored as data 276 in memory units 274.

For example, subsystem data collection application 280 may apply a first algorithm 282 to data received from life support subsystem 230 to determine one or more time-remaining values for breathable air. This algorithm 282 may examine the demand rate on breathable air thus far and the amount of breathable air remaining to calculate the time remaining. This calculation may be made for any suitable portion of the breathable air supplies of life support subsystem 230.

As another example, subsystem data collection application 280 may apply a second algorithm 282 to data received from guidance subsystem 250 to determine one or more steering instructions to provide to an operator of mine personnel carrier 100. This algorithm 282 may examine the output of one or more proximity sensors to determine which direction mine personnel carrier 100 is veering and, if appropriate, provide instructions to correct the path of the vehicle.

As another example, subsystem data collection application 280 may apply a third algorithm 282 to data received from guidance subsystem 250 to determine whether mine personnel carrier 100 is being approached by another entity. As a particular example, this algorithm 282 may examine the output of a proximity sensor on the front of carrier 100, the current speed of carrier 100, and the speed with which an entity detected by the proximity sensor on the front of carrier 100 is approaching carrier 100. If it is determined that the entity is approaching mine personnel carrier 100 faster than the speed at which mine personnel carrier 100 is traveling, it may be determined that the entity is not stationary but is approaching mine personnel carrier 100. Subsystem data collection application 280 may use the determination of this algorithm to determine whether to issue a warning (e.g., an audible warning, a visual warning on integrated information display 150, or both) to an operator of miner personnel carrier 100.

System 200 may include an integrated information display 150. Integrated information display 150 may comprise a unified electronic display, which may provide a mechanism for communicating information determined using information collected by the subsystems of mine personnel carrier 100 to an operator or other user of mine personnel carrier 100. The information displayed in integrated information display 150 may include any suitable data accessed (e.g., by subsystem data collection application 280) from the subsystems of mine personnel carrier 100. Additionally or alternatively, the information displayed in integrated information display 150 may include any suitable data determined (e.g., using 282) based on information accessed (e.g., by subsystem data collection application 280) from the subsystems of mine personnel carrier 100. As particular examples, the displayed information may include vehicle operational status (e.g., power supply and engine status), position relative to entry/exit walls, distance traveled, location within the mine, pressure of the on-board cascade air supply for the vehicle, and atmospheric characteristics (e.g., as measured by a gas sampling system). Integrated information display 150 may comprise any suitable type of display system, including a CRT display, LCD display, plasma display, LED display, or any other suitable type of display.

Integrated information display 150 may help an operator of mine personnel carrier 100 (and/or any other suitable personnel) make informed decisions related to the best and most effective manner of responding to an emergency situation in an underground mine, including the most efficient manner of escaping a dangerous area of the mine.

The components of system 200 may communicate using links 290. Links 290 may facilitate wireless or wireline communication. Links 290 may communicate, for example, Internet Protocol (IP) packets, Frame Relay frames, Asynchronous Transfer Mode (ATM) cells, voice, video, data, and other suitable information between network addresses. Links 290 may include one or more local area networks (LANs), radio access networks (RANs), metropolitan area networks (MANs), wide area networks (WANs), all or a portion of the global computer network known as the Internet, and/or any other communication system or systems at one or more locations.

Although a particular implementation of system 200 is illustrated and primarily described, the present disclosure contemplates any suitable implementation of system 200 according to particular needs. Although a particular number of components of system 200 have been illustrated and primarily described above, the present disclosure contemplates system 200 including any suitable number of such components. In certain embodiments, some or all of the components of system 200 may be removable from mine personnel carrier 100 and may be man portable.

In operation of an example embodiment of system 200, subsystem data collection application 280 may access data from one or more subsystems of mine personnel carrier 100. For example, subsystem data collection application 280 may access vehicle data from one or more sensors associated with chassis 220 of mine personnel carrier 100. As another example, subsystem data collection application 280 may access life support data from one or more sensors associated with life support system 230 of mine personnel carrier 100. As another example, subsystem data collection application 280 may access communication data from one or more communication systems 240 of mine personnel carrier 100. As another example, subsystem data collection application 280 may access guidance data from one or more guidance devices associated with guidance system 250 of mine personnel carrier 100. As another example, subsystem data collection application 280 may access navigation data from one or more navigation systems 260 of mine personnel carrier 100.

Subsystem data collection application 280 may access the data from the one or more subsystems in any suitable manner, according to particular needs. For example, devices (e.g., sensors) of the subsystems of mine personnel carrier 100 may proactively communicate the data to computing system 270 for storage in memory units 274 (e.g., as data 276). Subsystem data collection application 280 then may retrieve the data from memory units 274 as appropriate. As another example, subsystem data collection application 280 may poll the devices (e.g., sensors) of the subsystems of mine personnel carrier 100 to request the data. Subsystem data collection application 280 may or may not initiate storage of the data received in response to these requests in memory units 274.

Subsystem data collection application 280 (or another suitable component of system 200) may be operable to apply one or more algorithms 282 to combine or otherwise analyze data received from the subsystems of mine personnel carrier 100 to provide an operator or other suitable user of mine personnel carrier 100 with other decision-making input. This determined information may also be stored as data 276 in memory units 274. For example, as described above, subsystem data collection application 280 may apply a first algorithm 282 to data received from life support subsystem 230 to determine one or more time-remaining values for breathable air. As another example, as described above, subsystem data collection application 280 may apply a second algorithm 282 to data received from guidance subsystem 250 to determine one or more steering instructions to provide to an operator of mine personnel carrier 100. As another example, as described above, subsystem data collection application 280 may apply a third algorithm 282 to data received from guidance subsystem 250 to determine whether mine personnel carrier 100 is being approached by another entity.

Subsystem data collection application 280 may initiate display in integrated information display 150 of at least a portion of the data from the one or more subsystems of mine personnel carrier 100. As described above, integrated information display 150 may comprise a unified electronic display of mine personnel carrier 100. In other words, integrated information display 150 may provide a centralized information source for an operator of mine personnel carrier 100 or another suitable viewer to receive information relating to the various subsystems of mine personnel carrier 100, potentially improving the ability of and/or efficiency with which miners can escape a mine during or subsequent to a mine disaster.

In certain embodiments, subsystem data collection application 280 may access data from one or more of the subsystems of mine personnel carrier 100 on a substantially continuous basis. Additionally, subsystem data collection application 280 may performed appropriate calculations based on data collected from the one or more subsystems of mine personnel carrier 100 at any suitable interval. In certain embodiments, subsystem data collection application 280 may initiate display in integrated information display 150 of at least a portion of the data from the one or more subsystems of mine personnel carrier 100 at any suitable interval, which may be on a substantially continuous basis, such that appropriate mine personnel (e.g., an operator of mine personnel carrier 100) are presented with current information as soon as practicable.

Figure 3:
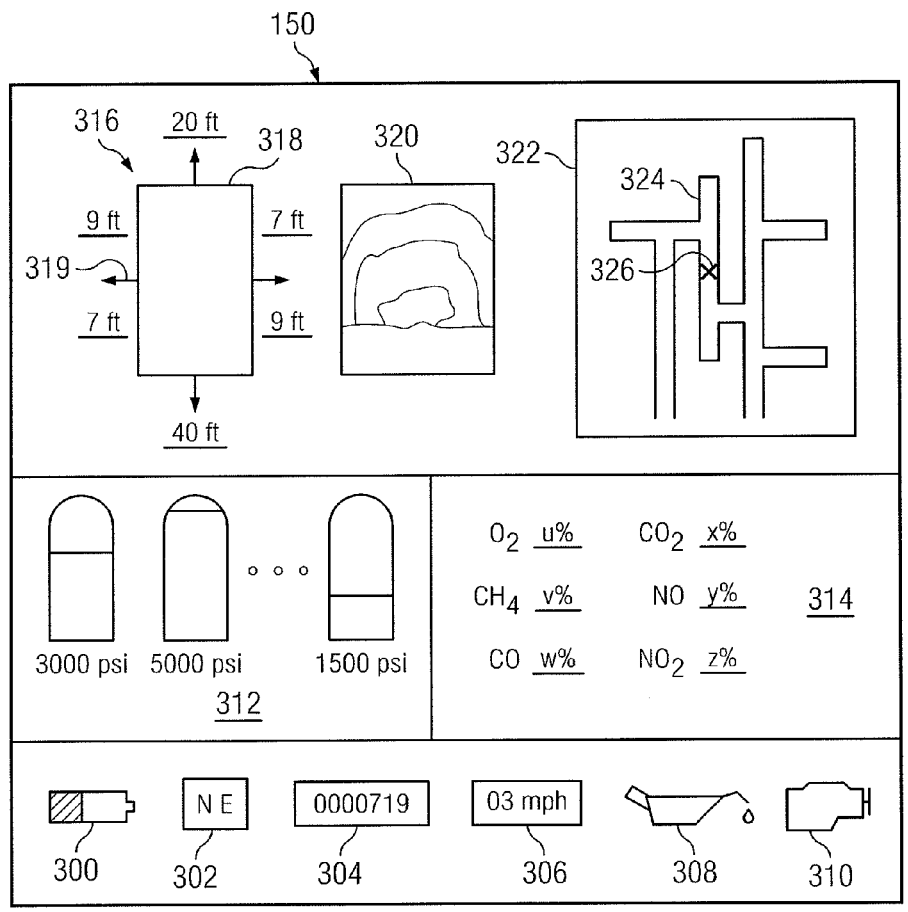
FIG. 3 illustrates an example integrated information display for a mine personnel carrier, according to certain embodiments of the present disclosure.

FIG. 3 illustrates an example integrated information display 150 of mine personnel carrier 100, according to certain embodiments of the present disclosure. The particular information and layout of integrated information display 150 that is illustrated in FIG. 3 is provided for example purposes only and should not be used to limit the present disclosure. The present disclosure contemplates an integrated information display 150 of mine personnel carrier 100 having any suitable information arranged in any suitable layout, according to particular needs.

The illustrated integrated information display 150 includes a variety of information from each of the subsystems of mine personnel carrier 100. In particular, integrated information display 150 may include information from chassis 220, life support subsystem 230, communication subsystem 240, guidance subsystem 250, and navigation subsystem 260. Although the illustrated information display 210 includes information from particular subsystems, the present disclosure contemplates integrated information display 150 presenting information from any suitable combination of these and other subsystems, according to particular needs. Additionally, although the illustrated information display 210 includes information from multiple subsystems being displayed simultaneously, the present disclosure contemplates integrated information display 150 presenting some, all, or none of the displayed information simultaneously. A button or other selection device may be provided that allows a user to change the source of the information in the display, if appropriate.

Integrated information display 150 includes a power-level indicator 300. Power-level indicator may provide an indication of the remaining battery charge. The battery may be a power source for the engine of mine personnel carrier 100 (if the engine is wholly or partially battery-powered), for components other than the engine of mine personnel carrier 100, or both. Integrated information display 150 includes a heading indicator 302, which reads NE, indicating Northeast. The source of the value displayed for heading indicator 302 may be a digital compass. Integrated information display 150 may include an odometer indicator 304, which may display the output of an odometer of mine personnel carrier 100. The odometer may assist an operator of mine personnel carrier 100 in navigating the vehicle to a mine exit or other suitable location in the mine. Integrated information display 150 may include a speedometer indicator 306, which may display the output of a speedometer of mine personnel carrier 100. Integrated information display 150 may include an oil level indicator 308 and engine status indicator 310, if appropriate. The sources for each of these displayed outputs may be embedded in any suitable part of mine personnel carrier 100 (e.g., as part of chassis 220, for example).

As shown generally in the middle layer of integrated information display 150, integrated information display 150 may include indicators relating to life support subsystem 230. For example, integrated information display 150 may include one or more breathable air indicators 312. Breathable air indicators 312 may indicate an amount of breathable air remaining for one or more breathable air sources. Individual breathable air sources of mine personnel carrier 100 may each have a corresponding breathable air indicator 312 on integrated information display 150 and/or groups of breathable air sources may share a single breathable air indicator 312. In the illustrated example, each tank icon corresponds to a breathable air source. The available air is represented both as a fill-line in the tank icon and in numbers (i.e., in psi) below the tank icon. An estimated remaining time indication could also be provided, which may be based on a computation using an algorithm 282 as described above. Although a particular number of breathable air indicators 312 are illustrated, integrated information display 150 may include any suitable number of breathable air indicators 312.

As another example, integrated information display 150 may include one or more gas level indicators 314. The data displayed by gas level indicators 314 may be determined according to the output of one or more atmospheric analyzers. Although particular gases are indicated, integrated information display 150 may list any suitable number and types of gases. Additionally, the gas level indicator 314 can present gas level information to an operator in any suitable manner. For example, gas level information may be presented on a substantially continuous basis (e.g., as a percentage or concentration). As another example, a particular gas may flash in an alarm-type manner when an atmospheric analyzer detects a dangerous or near-dangerous level of that gas.

Integrated information display 150 may include a first type of guidance display—a proximity display 316. In the illustrated example, proximity display 316 includes an icon 318 representing mine personnel carrier 100. Icon 318 may be oriented such that the front of the carrier 100 is at the top of the display, making icon 318 and proximity display 316 intuitive to the viewer. Numeric values are positioned around the perimeter of icon 318 at locations substantially similar to the positions of proximity sensors 140 (or other guidance devices) on the actual mine personnel carrier 100. The numeric values may represent the detected distance of an entity detected by the proximity sensor 140 at the corresponding location on mine personnel carrier 100. In this case, the numbers tend to show that mine personnel carrier 100 is potentially veering right, perhaps toward a wall to the right of mine personnel carrier 100. Although numeric values are illustrated and described, the present disclosure contemplates representing the proximity data in any other suitable manner. As an example, color-coded indicators may be used in place of numeric distances. As another example, icon 318 may not be included.

Proximity display 316 also includes a number of arrows 319. One or more of these arrows may be illuminated to indicate an instruction to the driver. For example, the arrow at the top of icon 318 may instruct the driver to increase speed. As another example, the arrow to the left of icon 318 may instruct the driver to veer left. In certain embodiments, whether to illuminate and arrow 319 and, if so, which arrow 319 to illuminate may be determined by subsystem data collection application 280 using one or more algorithms 282 based on the guidance data received from proximity sensors 140.

Integrated information display 150 may include a second type of guidance display—one or more infrared camera image displays 320. An infrared image display 320 may display infrared images captured by an infrared camera positioned on mine personnel carrier 100. This may be a particularly useful option in the front of mine personnel carrier 100, though the present disclosure contemplates using any suitable number of infrared cameras. To the extent multiple infrared cameras are positioned around mine personnel carrier 100, integrated information display 150 may include corresponding, simultaneous displays for each camera, or may include single portion for displaying images from the cameras with the ability to switch the source camera (e.g., in response to a user request or at a suitable interval).

Integrated information display 150 may include a navigation display 322. In the illustrated example, navigation display 322 includes a map 324 of the mine layout and a current position 326 of mine personnel carrier 100. Additional information, such as the location of other miner personnel carriers 100, the location of various checkpoints within the mine, the location of other miners or mining equipment, and any other suitable information, may be displayed. This information may be determined using any suitable navigation technology, such as the above-described navigation systems. As described above, odometer indicator 304 may be useful for navigation purposes, as well.

Particular embodiments of the present disclosure may provide one or more technical advantages. As described above, post-incident conditions in a mine may include high CO, $CO_2$, $CH_4$, NO, $NO_2$ concentrations and low $O_2$ concentrations, low- or no-visibility due to smoke or dust particles, entry obstructions such as downed over-casts and stopping materials, lack of communications caused by an explosion or fire, and atmospheres that can potentially foster secondary explosions/fires. In certain embodiments, mine personnel carrier 100 includes an ability to counteract or otherwise address one or more of these post-incident conditions. For example, embodiments of mine personnel carrier 100 include a number of subsystems each designed to address one or more of these disaster conditions.

In certain embodiments, mine personnel carrier 100 includes integrated information display 150. Integrated information display 150 may provide a centralized source for a vehicle operator (or other suitable passenger) to obtain information. Principal causes of death in mining accidents often include polluted atmospheres and an inability of mine personnel to escape dangerous areas of the mine. The centralized nature of embodiments of integrated information display 150 may be particularly beneficial in an emergency situation when response time is critical, visibility may be impaired, and other distractions may exist. The integrated information display 150 of certain embodiments of the present disclosure may provide a more efficient way for miners to gather information pertinent to escaping either the mine or a dangerous area of a mine in an easier manner. In certain embodiments, integrated information display 150 may be brightly illuminated such that it remains visible even in conditions of low- or no-visibility, which may be present in a mine subsequent to and/or during a disaster. Miners often experience post-incident mental stresses, potentially including panic and disorientation, which may impact the miners' abilities to interact with complex and scattered equipment. Providing a single, unified electronic display (e.g., integrated information display 150) can help minimize the impact of these emotional factors on the miner's performance in escaping a dangerous area of the mine.

Figure 4:
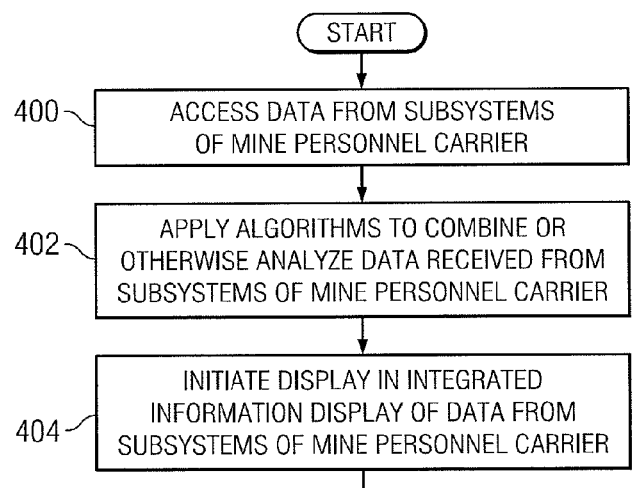
FIG. 4 illustrates an example method for generating an integrated information display for a mine personnel carrier, according to certain embodiments of the present disclosure.

FIG. 4 illustrates an example method for generating the integrated information display of mine personnel carrier 100, according to certain embodiments of the present disclosure. In certain embodiments, steps of the method described with reference to FIG. 4 may be performed by subsystem data collection application 280. However, the present disclosure contemplates any suitable components of mine personnel carrier 100, including any suitable components of system 200, in any suitable combination, performing the steps of the method and any sub-steps.

At step 400, subsystem data collection application 280 may access data from one or more subsystems of mine personnel carrier 100. For example, subsystem data collection application 280 may access vehicle data from one or more sensors associated with chassis 220 of mine personnel carrier 100. As another example, subsystem data collection application 280 may access life support data from one or more sensors associated with life support system 230 of mine personnel carrier 100. As another example, subsystem data collection application 280 may access communication data from one or more communication systems 240 of mine personnel carrier 100. As another example, subsystem data collection application 280 may access guidance data from one or more guidance devices associated with guidance system 250 of mine personnel carrier 100. As another example, subsystem data collection application 280 may access navigation data from one or more navigation systems 260 of mine personnel carrier 100.

Subsystem data collection application 280 may access the data from the one or more subsystems in any suitable manner, according to particular needs. For example, devices (e.g., sensors) of the subsystems of mine personnel carrier 100 may proactively communicate the data to computing system 270 for storage in memory units 274 (e.g., as data 276). Subsystem data collection application 280 then may retrieve the data from memory units 274 as appropriate. As another example, subsystem data collection application 280 may poll the devices (e.g., sensors) of the subsystems of mine personnel carrier 100 to request the data. Subsystem data collection application 280 may or may not initiate storage of the data received in response to these requests in memory units 274.

At step 402, subsystem data collection application 280 (or another suitable component of system 200) may be operable to apply one or more algorithms 282 to combine or otherwise analyze data received from the subsystems of mine personnel carrier 100 to provide an operator or other suitable user of mine personnel carrier 100 with other decision-making input. This determined information may also be stored as data 276 in memory units 274. For example, as described above, subsystem data collection application 280 may apply a first algorithm 282 to data received from life support subsystem 230 to determine one or more time-remaining values for breathable air. As another example, as described above, subsystem data collection application 280 may apply a second algorithm 282 to data received from guidance subsystem 250 to determine one or more steering instructions to provide to an operator of mine personnel carrier 100. As another example, as described above, subsystem data collection application 280 may apply a third algorithm 282 to data received from guidance subsystem 250 to determine whether mine personnel carrier 100 is being approached by another entity.

At step 404, subsystem data collection application 280 may initiate display in integrated information display 150 of at least a portion of the data from the one or more subsystems of mine personnel carrier 100. As described above, integrated information display 150 may comprise a unified electronic display of mine personnel carrier 100. In other words, integrated information display 150 may provide a centralized information source for an operator of mine personnel carrier 100 or another suitable viewer to receive information relating to the subsystems of mine personnel carrier 100, potentially improving the ability of and/or efficiency with which miners can escape a mine during or subsequent to a mine disaster.

In certain embodiments, subsystem data collection application 280 may access data from one or more of the subsystems of mine personnel carrier 100 on a substantially continuous basis. Additionally, subsystem data collection application 280 may performed appropriate calculations based on data collected from the one or more subsystems of mine personnel carrier 100 at any suitable interval. In certain embodiments, subsystem data collection application 280 may initiate display in integrated information display 150 of at least a portion of the data from the one or more subsystems of mine personnel carrier 100 at any suitable interval, which may be on a substantially, such that appropriate mine personnel (e.g., an operator of mine personnel carrier 100) are presented with current information as soon as practicable.

Additionally, although a particular method has been described with reference to FIG. 4, the present disclosure contemplates any suitable method in accordance with the present disclosure. Thus, certain of the steps described with reference to FIG. 4 may take place substantially simultaneously and/or in different orders than as shown and described. Moreover, components of system mine personnel carrier 100 and/or system 200 may use methods with additional steps, fewer steps, and/or different steps, so long as the methods remain appropriate. Furthermore, although particular components of mine personnel carrier 100 and/or system 200 are described as performing particular steps of the method described with reference to FIG. 4, the present disclosure contemplates any suitable components of mine personnel carrier 100 and/or system 200 performing the steps.

The following tables provide example models/components for the chassis 110, communication subsystem, life support subsystem, and guidance subsystem, respectively, which may be appropriate for certain embodiments of mine personnel carrier 100. These models/components and associated information are provided for example purposes only and should not be used to limit the present disclosure. The present disclosure contemplates implementing mine personnel carrier and/or system 200 using any suitable models/components, according to particular needs. Furthermore, it is possible that over time certain information reflected has changed or will change.

Example Chassis Product List

| Component Name | Manufacturer | Size (Feet) L | W | H | Weight (lbs.) | MSHA Approved (Y, N) |
|---|---|---|---|---|---|---|
| Rail-Mount Personnel Carrier | Brookville Equipment | U | U | U | U | N |
| Rubber Tire Personnel Carrier | Brookville Equipment | 23.75 | 9.33 | 5.00 | 18,000 | N |
| Rubber Tire Personnel Carrier (Diesel-1544TC) | Brookville Equipment | 31.00 | 10.00 | 6.04 | 37,200 | Y (Engine - outby) |
| MAC-10DI/MAC-10D | Damascus | 16.33 | 9.00 | 3.13 | 3100 | Y (Engine - outby) |
| MAC-8 | Damascus | 14.00 | 8.00 | 2.60 | 2740 | N |
| MAC-8DI/MAC-8D | Damascus | 15.00 | 8.00 | 3.13 | 2850 | Y (Engine - outby) |
| MAC-XP | Damascus | 13.67 | 5.33 | 2.19 | 2500 | Y |
| Crew Hauler | Genco | 16.50 | 5.58 | 5.00 | 4400 | Y (Engine certified - not approved) |
| 7078 Terrapro | Getman | 23.92 | 6.50 | 5.83 | 15,000 | Y (Engine - outby) |
| 7090 Terrapro | Getman | 233.92 | 7.50 | 5.83 | 15,000 | Y (Engine - outby) |
| Minecat UT99 | Industrial Fabrication Inc. | 16.63 | 6.25 | 6.88 | 6100 | Y (Engine - outby) |
| 4 × 4 Super Steer | Johnson Industries | 19.67 | 8.08 | 3.00 | U | Y (Engine - outby) |
| Hornet | Johnson Industries | 15.75 | 6.00 | Cust. | U | N |
| Mean Green | Johnson Industries | 17.33 | 6.17 | 2.25 | U | N |
| Stinger | Johnson Industries | 13.42 | 5.17 | 2.33 | 2900 | Y |
| SXM (10-Man) | Johnson Industries | 15.83 | 7.58 | Cust. | U | N |
| SXM (12-Man) | Johnson Industries | 15.83 | 7.58 | Cust. | U | N |
| SXM (5-Man) | Johnson Industries | 14.75 | 6.00 | Cust. | U | N |
| SXM (7-Man) | Johnson Industries | 15.08 | 6.00 | Cust. | U | N |
| WASP | Johnson Industries | 15.75 | 6.00 | 2.83 | U | Y (Engine - outby |
| Yellow Jacket | Johnson Industries | 15.42 | 6.00 | 2.50 | 3800 | Y |

| Component Name | Power Mechanical (HP) | Electrical (Volts) | Number of Units in Service | Comments |
|---|---|---|---|---|
| Rail-Mount Personnel Carrier | U | U | U | Rail-Mount Trolley; Capacity up to 18; non-permissible; range: unlimited with constant connection to trolley pole |
| Rubber Tire Personnel | 30 to 100 HP | (2) | 60-80 | Battery; capacity of 9-13; non-permissible; range - 8 hr |

-continued

| | | | | |
|---|---|---|---|---|
| Carrier (Battery) | | | | life; 8-12 mph |
| Rubber Tire Personnel Carrier (Diesel-1544TC) | 174 HP | NA | 60-80 | Diesel; capacity of 9-13; non-permissible; 30 gal fuel tank; 8-12 mph; exhaust treatment system |
| MAC-10DI/ MAC-10D | 49 HP | NA | <100 | Diesel; capacity of 14; speed of 11.5 mpg on 18% grade; 12.25 gal fuel tank; 9" ground clearance; rubber tires; optional winch; hydrostatic drive |
| MAC-8 | 8 HP | (8) 6VDC | >1000 | Battery; capacity of 12; non-permissible; range - 145 min @ 75 amps; 7 mph; rubber tires; no overhead protection; both AC (72 V) or DC motors (AC motors have 1.5 times distance than DC) |
| MAC-8DI/ MAC-8D | 41 HP/ 49 HP | NA | <100 | Diesel; capacity of 8-10; speed of 11.5 mph on 18% grade; 12.25 gal fuel tank; 9" ground clearance; rubber tires; optional winch; hydrostatic drive |
| MAC-XP | NA | 72 VDC | <100 | Battery; capacity of 3 (can build to seat additional miners); permissible; 8.5" ground clearance; rubber-tired; 135 amp/hour rated |
| Crew Hauler | 75 HP | NA | >100 | Diesel; capacity of 8-10; totally enclosed or only operator enclosed; 4 wheel drive; 9" ground clear; over 100 units in service; speed up to 22 mph (low gear); 12-14 gal fuel tank; |
| 7978 Terrapro | 168/147 | NA | 40 | Diesel; enclosed compartment for all occupants; capacity of 3 miners; speed up to 25 mph; fall protection roof; 16 gal tank; non-permissible; approx 40 units in service (Patriot); fits a stretcher |
| 7090 Terrapro | 168/147 | NA | 40 | Diesel; enclosed compartment for all occupants; capacity up to 15 miners; speed up to 25 mph; fall protection roof; 16 gal tank; non-permissible; approx 40 units in service (Patriot); fits a stretcher |
| Minecat UT99 | 99 HP | NA | 0 | Diesel; capacity of 8-10; speed of 13 to 19 mph; 19.5 gal fuel tank; 9.5" ground clearance; NEMA 12 enclosed electrical system (not IS); designed for M/NM mines |
| 4 × 4 Super Steer | 38/60/74 | NA | 50-100 | Diesel; carries 8-12 miners; range of engines; open-air style; rubber tires; 8-11" ground clearance; 4-wheel drive; 4-wheel steering; 12 gal; 21 mph; approx 50-100 (Arch) |
| Hornet | 9 | (8) 6VDC | U | Battery; carries 7-9 miners; (8) 6 V battery pack (included); open-air style; rubber tires; 10" ground clearance; front & rear halogen lights; non-permissible |

-continued

| | | | | |
|---|---|---|---|---|
| Mean Green | 9 | (8) 6VDC | U | Battery; carries 10-12 miners; (8) 6 V battery pack (included); open-air style; rubber tires; 7½" ground clearance; non-permissible |
| Stinger | 10 | 72 VDC | 470 | Battery; carries 2-3 miners; 72 V battery pack (included); open-air style; rubber tires; 7-11" ground clearance; 0-9 mph; range is 6 to 7 miles per charge; approx 470 (Rosebud) |
| SXM (10-Man) | 10 | 72VDC | U | Battery; carries 10 miners; 72 V battery pack (included); open-air style; rubber tires; Custom ground clearance; non-permissible |
| SXM (12-Man) | 10 | 72 VDC | U | Battery; carries 12 miners; 72 V battery pack (included); open-air style; rubber tires; Custom ground clearance; non-permissible |
| SXM (5-Man) | 10 | 72 VDC | U | Battery; carries 5 miners; 72 V battery pack (included); open-air style; rubber tires; Custom ground clearance; air bag suspension |
| SXM (7-Man) | 10 | 72 VDC | U | Battery; carries 7 miners; 72 V battery pack (included); open-air style; rubber tires; Custom ground clearance; air bag suspension |
| WASP | 38/44/59 | NA | 50-100 | Diesel; carries 2-4 miners; range of engines; open-air style; rubber tires; 11" ground clearance; 2-wheel drive; 2 wheel steering; 12 mph; approx 50-100 |
| Yellow Jacket | 10 | 72 VDC | 350 | Battery; carries 10-12 miners; 72 V battery pack (included); open-air style; rubber tires; 7-11" ground clearance; permissible; approx 350 (Rosebud) |

U: Information unavailable
Cust.: Custom
Engine - outby: Vehicle not approved for use near the working face or in return air
NA: Non-applicable Example Communications Product List

| Component Name | Mfr. | Size (Feet) | | | Wt. (lbs.) | AVL (0, <2, >2) | MSHA App'd (Y, N) | Power Elec. (Volts) |
|---|---|---|---|---|---|---|---|---|
| | | L | W | H | | | | |
| ActiveMine | Active Control | U | U | U | U | 0 | N | U |
| SmartMsg | Codespear - Now part of Federal Signal Public Safety Systems | 0.55 | 0.33 | 0.11 | 0.79 | 0 | N | U |
| Mine Tracer | Helicomm | U | U | U | U | 0 | Y | U |
| DRUM 100P (Digital Radio for Underground Mines) | Kutta | 0.58 | 1.08 | 0.17 | 8.00 | 0 | Y | Battery |

| | | | | | | | | |
|---|---|---|---|---|---|---|---|---|
| METS 2.1 | Matrix Design Group | U | U | U | U | 0 | Y | Wired |
| NetPort IS (Messenger Cap Lamp, WiFi Tracking) | NLT | U | U | U | U | 0 | Y | U |
| Breadcrumb LX | Rajant | 0.66 | 0.46 | 0.14 | 3.4 | 0 | N | 24-48 VDC |
| Breadcrumb ME2 | Rajant | 0.58 | 0.40 | 0.14 | 0.80 | 0 | N | 6-15 VDC |
| Breadcrumb SE | Rajant | 0.71 | 0.54 | 0.29 | 2.50 | 0 | N | 6-15 VDC |
| Breadcrumb XLR | Rajant | 1.58 | 0.67 | 0.15 | 4.00 | 0 | N | 9-40 VDC |
| Breadcrumb XLV (Vehicle) | Rajant | 0.98 | 1.06 | 0.21 | 14.20 | 0 | N | 6-40 VDC |
| Subterra M8 | Subterra Com | 0.31 | 0.42 | 0.13 | <1 | 0 | Y | battery |
| Subterra-ZAP | Subterra Com | .05 | 0.3 | 1 | 14.5 | 0 | Y | 120/240 VAC |
| MineAx Bird Dog Tag | Tunnel Radio | 0.21 | 0.13 | 0.06 | 0.08 | U | Y | ABS UL94V |
| UltraComm Wireless Radio Comms | Tunnel Radio | 0.50 | 1.60 | 2.00 | U | U | Y | 13 VDC IS/40 VDC Max |

| | | Suitability for Emergency (Y, N) | | | | | |
|---|---|---|---|---|---|---|---|
| Component Name | Intrinsically Safe/XP (Y, N) | Low VIS (Y, N) | Low Oxygen | CH4 ATMO | Fire | OBST | |
| ActiveMine | Y | U | U | U | U | U | |
| SmartMsg | N | U | U | U | U | U | |
| Mine Tracer | Y | Y | Y | Y | Y | Y | |
| DRUM 100P (Digital Radio for Underground Mines) | Y | Y | Y | Y | Y | Y | |
| METS 2.1 | Y | Y | Y | Y | N | Y | |
| NetPort IS (Messenger Cap Lamp, WiFi Tracking) | Y | Y | Y | Y | Y | Y | |
| Breadcrumb LX | N | Y | Y | Y | Y | Y | |
| Breadcrumb ME2 | N | Y | Y | Y | Y | Y | |
| Breadcrumb SE | N | Y | Y | Y | Y | Y | |
| Breadcrumb XLR | N | Y | Y | Y | Y | Y | |
| Breadcrumb XLV (Vehicle) | N | Y | Y | Y | Y | Y | |
| Subterra M8 | Y | Y | Y | Y | Y | Y | |
| Subterra-ZAP | Y | Y | Y | Y | Y | Y | |
| MineAx Bird Dog Tag | N | U | U | U | U | U | |
| UltraComm Wireless Radio Comms | N | U | U | U | U | U | |

| Component Name | Comments |
|---|---|
| Active Mine | 100% Wireless Wi-Fi network w/ nodes and tracking devices; two-way wireless voice communications, tracking and data system; 96 hr battery back-up; wireless mesh network |

-continued

| | |
|---|---|
| SmartMsg | Provides link between UHF and VHF; not mine tested; designed for above ground public safety systems |
| Mine Tracer | Wireless access point (WAP); wireless comms (text messaging) and tracking; twisted pair wired backbone; IEEE 802.15.4 standard; wireless mesh network; 48 hr batter back-up |
| DRUM 100P (Digital Radio for Underground Mines) | Handheld, point-to-point comms for up to 2 miles; voice only. Non-line of sight coms up to 4 miles between nodes. Operation when mine power is off. Use with existing mine infrastructure, Interoperability with VHF and UHF radios & leaky feeders |
| METS 2.1 | Equipment tracking ONLY via RFID tags; wired mesh network system; 24 hr battery back-up; atmospheric monitoring via Matrix IS Wireless Atmospheric Monitoring System (WAMS) sensors - not yet MSHA approved |
| NetPort IS (Messenger Cap Lamp, WiFi Tracking Tags) | 2-way text messaging and tracking via RFID; messaging and tracking w/ system, IS; Wireless Local Area Network (WLAN); 802.11 open standards WiFi; |
| Breadcrumb LX | Wireless hub; comes w/ portable radio; NEMA 6 (non-XP rated); powered by an internal battery or an external 6-15 Vdc power source; IEEE 802.11b wireless Ethernet protocol |
| Breadcrumb ME2 | Wireless transmitter/receiver w/ portable radio; powered by an internal battery or an external 6-15 Vdc power source; IEEE 802.11 b wireless Ethernet protocol |
| Breadcrumb SE | Wireless transmitter/receiver w/ 2 portable radios; range up to 1/2 mile; standard Portable repeater that provides network backhaul and network availability for a certain area; powered by an internal battery or an external 6-15 Vdc power source |
| Breadcrumb XLR | Rack mounted, accepts vehicle power, good in shock, vibration, temp extremes; designed for vehicle; range up to 5 miles; powered by an internal battery or an external 6-15 Vdc power source; IEEE 802.11 b wireless Ethernet protocol |
| Breadcrumb XLV (Vehicle) | Wireless Transmitter/receiver w/ 2 portable radios; designed for vehicle use; range up to 5 miles; designed to be powered from a vehicular electrical system; IEEE 802.11 b wireless Ethernet protocol |
| Subterra M8 | Battery operated node that must have SubterraMine system (Subterra-ZAP and VU software); IEEE 802.11 b wireless Ethernet protocol; comms with text messaging and tracking |
| Subterra-ZAP | Wireless Node for Subterra-M8; not for vehicle mounting; creates the network infrastructure; uses 802.11 x to provide voice and text options. Works w/ wireless radios w/ optional CAT-5 LAN. Can run on AC or DC and has optional battery backup |
| MineAx Bird Dog Tag | Tracking Tag Reader; supports wireless readers via leaky feeder, Ethernet and hardwire |
| UltraComm Wireless Radio Comms | 2-way wireless coms; 24 to 96 hr battery back-up; multi-channel radio offering 155 VHF or 500 MHz UHF; head-end unit with repeaters and network interface |

U: Information unavailable

Example Life Support/SCBA Product List/Gas Detector

| | Product | | Size (inches) | | | Size Vol. | Wt. |
|---|---|---|---|---|---|---|---|
| Type | Name | Mfr. | L | W | H | in³ | (lbs.) |
| SCBA/CCBA | Biopak 240 | Biomarine/Scott | 23.00 | 17.30 | 7.00 | 2785 | 33 |
| SCBA/CCBA | BG4 | Drager | 23.40 | 17.76 | 7.20 | 2992 | 30 |
| SCBA | AirBoss PSS 97 | Drager | 28.50 | 11.00 | 7.00 | 2195 | 40 |
| CABA | Air-Pak XX | Scott | 28.50 | 11.00 | 7.00 | 2195 | 40 |
| CABA | Viking Z seven | Avon | 28.50 | 11.00 | 7.00 | 2195 | 40 |
| CABA | Firehawk M7 | MSA | 28.50 | 11.00 | 7.00 | 2195 | 40 |

-continued

| | | | | | | | |
|---|---|---|---|---|---|---|---|
| CABA | Spiromatic S4 | Interspiro | 28.50 | 11.00 | 7.00 | 2195 | 40 |
| CABA | Warrior SCBA | Survivair/ Sperian Fire | 28.50 | 11.00 | 7.00 | 2195 | 40 |

| Product Name | MSHA/ NIOSH Duration (min) | $O_2$ cylinder Pressure (PSI) | MSHA App'd (Y, N, P) | Intrinsically Safe/XP (Y, N) | Suitability for Emergency (Y, N, N/A) Low $O_2$ | CH4 ATMO |
|---|---|---|---|---|---|---|
| Biopak 240 | 240 | 3000 | Y | Y | Y | Y |
| BG4 | 240 | 3000 | Y | Y | Y | Y |
| AirBoss PSS 97 | 60 | 4500 | Y | Y | Y | Y |
| Air-Pak XX | 60 | 4500 | Y | Y | Y | Y |
| Viking Z seven | 60 | 4500 | Y | Y | Y | Y |
| Firehawk M7 | 60 | 4500 | Y | Y | Y | Y |
| Spiromatic S4 | 60 | 4500 | Y | Y | Y | Y |
| Warrior SCBA | 60 | 4500 | Y | Y | Y | Y |

| Product Name | Source Document | Comments |
|---|---|---|
| Biopak 240 | www.biopack240R.com | Vendor willing to customize, Product includes Scott AV3000 facemask that allows voice communication or radio communications using a specially adapted mic. Requires ice canister for refrigeration. Easily exchangeable scrubber canisters. 4 hour duration |
| BG4 | www.draeger-safety.com/us | 4 hour Closed Circuit Breathing Apparatus CCBA is widely used by rescue personnel. Similar in operation and features to Biopack. Condensation in the mask is a problem because is a closed circuit system. |
| AirBoss PSS 97 | www.draeger-safety.com/us | SCBA system that uses compressed air and can be recharged at refill stations along the escape route. Requires a system approach for the installation. A seal does not have to be broken when filling cylinders and personnel can communicate with the unit on. A facemask protects eyes from smoke. There are no fogging problems because is not a rebreather system. Duration can be 67 to 102 minutes depending on tank size, number and fill pressure. |
| AIR-Pak XX | www.scotthealthsafety.com | Complete line of systems including CABA systems with variety of tank sizes, pressures, durations. Components available include face masks, communications, etc. |
| Viking Z seven | www.intsafety.com | CABA system with features including wireless electronics, data logging, PASS alarm, voice amplification system and control console. |
| Firehawk M7 | www.msafire.com | Complete CABA systems with variety of options such as face mask, tank sizes, pressures, duration, communication, refill systems, etc |
| Spiromatic S4 | www.interspiro.com | CABA system with features including ambient air hatch, heads up display, regulator allows extreme breathing rates and connect to a second mask. |
| Warrior SCBA | www.sperianprotection.com | Complete CABA systems with variety of options such as face mask, tank sizes, pressures, duration, communication, etc |

-continued

| Type | Product Name | Mfr. | Size (inches) L | W | H | Size Vol. in³ | Wt. (lbs.) |
|---|---|---|---|---|---|---|---|
| SCSR | EBA 6.5 | Ocenco | 8.50 | 11.80 | 4.50 | 451 | 8.2 |
| SCSR | M20 | Ocenco | 7.20 | 6.50 | 3.10 | 145 | 3.3 |
| SCSR | SR-100 | CSE | 7.75 | 4.00 | 5.50 | 171 | 5.7 |
| SCSR | Oxy K Plus | Drager | 7.80 | 10.00 | 4.00 | 312 | 6 |
| SCSR | Oxon Charger 10 | Oxon Medical Life | 6.00 | 7.00 | 2.50 | 105 | 4 |
| SCSR | Oxon Charger 150 | Systems | 12.00 | 14.00 | 4.00 | 672 | 8 |
| SCSR | Life-Saver 60 | MSA | 7.70 | 4.80 | 5.60 | 207 | 5.9 |
| SCSR | Biocell 1 | Fenzy | 7.00 | 7.50 | 3.41 | 179 | 4.1 |
| SCSR FSR | SCSR + 2 (Hybrid) | TP Mft. | 3.00 | 7.00 | 10.00 | 210 | 5.8 |
| FSR | W65 | MSA | 2.50 | 4.00 | 5.00 | 50 | 2.2 |

| Product Name | MSHA/ NIOSH Duration (min) | $O_2$ cylinder Pressure (PSI) | MSHA App'd (Y, N, P) | Intrinsically Safe/XP (Y, N) | Suitability for Emergency (Y, N, N/A) Low $O_2$ | CH4 ATMO |
|---|---|---|---|---|---|---|
| EBA 6.5 | 60 | 3000 | Y | Y | Y | Y |
| M20 | 10 | 3850 | Y | Y | Y | Y |
| SR-100 | 60 | N/A | Y | Y | Y | Y |
| Oxy K Plus | 60 | N/A | Y | Y | Y | Y |
| Oxon Charger 10 | 10 | N/A | P | Y | Y | Y |
| Oxon Charger 150 | 150 | N/A | P | Y | Y | Y |
| Life-Saver 60 | 60 | N/A | Y | Y | Y | Y |
| Biocell 1 | 30* | N/A | N | Y | Y | Y |
| SCSR + 2 (Hybrid) | 60 60 | 4500 N/A | P P | Y Y | Y Y | Y Y |
| W65 | 60* | N/A | Y | Y | Y | Y |

| Product Name | Features | Source Document | Comments |
|---|---|---|---|
| EBA 6.5 | Oxygen Tank, $CO_2$ scrubber, gauge and valve | www.ocenco.com/EBA6.5.pdf | It's the most widely used emergency escape breathing apparatus in the US mining industry |
| M20 | Small, 15 yr life, belt wearable, pressure gauge | | Is the smallest SCSR available |
| SR-100 | Uses $KO_2$ and LiOH, 10 yr life | www.csecorporation.com/pdf.sr-100/pdf | Standard SCSR used in most coal mines. Mouth piece makes communication difficult and exchanging unit requires removing mouth piece. Duration 1 hr. Does not have oxygen indicator. |
| Oxy K Plus | 15 yr life, Pressure gauge | | |
| Oxon Charger 10 | Hooded mask, dockable | ww.oxonmed.com/Products.html | Use proprietary chemistry for $O_2$ generation and also for $CO_2$ scrubbing |
| Oxon Charger 150 | Hooded mask, dockable | | |

-continued

| | Life-Saver 60 | | Product discontinued in 2005, 10 yr life | www.msanorthamerica.com | |
| | Biocell 1 | | Chemical oxygen, stored units need no maintenance for 3 years | | No record of MSHA certification found |
| | SCSR + 2 (Hybrid) | | Oxygen tank, change over valve, complete system includes the SCSR, gas monitor and CO scrubber | www.tpm-safety.com | TPM's SCSR is a state-of-the-art compressed oxygen escape Oxygen tank, rebreather with unique docking valve change over for attaching additional breathing valve, complete devices without breaking seal. TPM's SCSR incorporates a demand regulator and modern $CO_2$ scrubbing technology. Can be used as a stand-alone device or with the hybrid SCSR + 2 system. Units are one-hour duration but manufacturer can build a 2-hour unit if needed. |
| | W65 | | small size, uses oxidation catalyst Hipcalite to convert CO into $CO_2$, 15 yr life | www.msanorthamerica.com | Only effective against CO |

| Type | Component Name | Mfr. | Source Document | Comments |
|---|---|---|---|---|
| Methane Monitor | Model S800 | General Monitors | http://www.generalmonitors.com | Single person calibration, large two-inch digital display, constant display of methane concentration in % by volume or LEL, provides relay connections for warn and alarm conditions. |
| Methane Monitor | Model 102A | Appalachian Electronic Instruments | http://www.aei-wv.com | System includes monitor, power supply and sensor. Power supply is not IS and needs to be installed in a permissible box, some models accept dual sensors, display size ¾", designed to monitor up to 2% methane. |
| Methane Monitor | Model 420D | General Monitors | http://www.generalmonitors.com | Discontinued |
| Methane Monitor | Model 500 | Appalachian Electronic Instruments | http://www.aei-wv.com | Uses components similar to the 102A model, the main difference is the display that has larger size digits. |

-continued

| | | | | |
|---|---|---|---|---|
| Methane Monitor | Smart Methane Monitor System | General Monitors | http://www.generalmonitors.com | S4000 C or T are products in this category, C version is only for combustible gases, T version can measure toxic gases, system compatible with computer or PLC for use in machinery, display can be adapted for direct readout. |
| Methane Detector | MX6iBrid | Industrial Scientific | www.indsci.com | Continuous and simultaneous monitoring of up to 6 gases, full-color graphic LCD, 25 sensor option, PID and IR sensor options, extended measuring ranges for use by mine rescue teams after disasters, docking station. |
| Methane Detector | X-AM 2000 | Draeger | http://www.draeger.com/ST/internet/CS/en/Aboutus/our_products/our_products.jsp | 1 to 4 gas configuration, 1000 hr data logging, user replaceable sensors, water and dust resistant |
| Methane Detector | Observer | Schauenburg | http://www.schauenburg.ca | No information available |
| Methane Detector | X-AM 3000 | Draeger | http://www.draeger.com/ST/internet/CS/en/Aboutus/our_products/our_products.jsp | Optional built-in remote sample pump, audible, visual and vibrating alarms, internal data logger. |
| Methane Detector | PAC EX2 | Draeger | http://www.draeger.com/ST/internet/CS/en/Aboutus/our_products/our_products.jsp | Monitors combustible gases and oxygen, loud audible, visual and vibrating alarm, Large LCD readout, internal data logger |
| Methane Detector | M40 | Industrial Scientific | www.indsci.com | 1 to 4 sensor, vibrating alarm, rechargeable battery, peak/hold readings, 75 hr data logging capable, belt clip, sampling pump for remote measurements, audible and visual alarm |
| Methane Detector | Solaris | Mine Safety Applications | http://www.msanorthAmerica.com | 4-gas instrument for simultaneous detection of CO, O2, H2S and combustible gas, rechargeable batteries, auto calibration, alarm system, sampling pump optional. |
| Methane Detector | G20/G40 | General Monitors | http://www.generalmonitors.com | Discontinued |
| Methane Detector | iTX | Industrial Scientific | www.indsci.com | Continuous and simultaneous monitoring of up to 6 gases, LEL/CH4 over-range protection, 90 db audible & bright alarm, 300 hr of data storage |

-continued

| | | | | |
|---|---|---|---|---|
| Methane Detector | Multiwarn II | Draeger | http://www.draeger.com/ST/internet/CS/en/Aboutus/our_products/our_products.jsp | Multi-gas instrument compatible with 25 sensors, two catalytical sensors for combustible gases and two IR sensors. Detects up to 5 gases continuously, optional internal pump, data logging capable. |
| Methane Detector | MicroMax Pro-M | Lumidor Safety | http://www.lumidor.com/Home.aspx | Simultaneous monitoring of 1-5 gases, combines diffusion and built-in internal sampling pump, data logging capable; visual, audible and voice alarm. |
| Methane Detector | Explorer 4 | CSE | www.csecorporation.com | Backlit LCD, data logging capability, sampling by diffusion or internal pump, 90 dB audible and visual alarm, programmable hi/low alarms, 2 to 4 simultaneous readings. |
| Methane Detector | MiniWarn | Draeger | http://www.draeger.com/ST/internet/CS/en/Aboutus/our_products/our_products.jsp | Multi-gas monitor, 25 plug-and-play sensors available, visual and audible alarm, remote sampling pump available for use in confine space. |
| Methane Detector | Multilog 2000 | Quest Technologies | http://www.quest-technologies.com/Gas/ml2000.htm | Multi-gas monitor measures up to 4 simultaneous gases, automatic sensor recognition, alarm set points, temperature compensation, |
| Methane Detector | LTX311 | Industrial Scientific | www.indsci.com | Multi-gas monitor for oxygen, combustible gases and one toxic gas, illuminated display, rechargeable battery, remote sampling pump available. |
| Methane Detector | CD211 | Industrial Scientific | www.indsci.com | Hand-held digital methanometer, 0 to 5% range methane measurements, 1.75 inch ultra bright readout, used for spot check, |
| Methane Detector | ATX620 | Industrial Scientific | www.indsci.com | 1-4 gas monitoring, one button calibration, built-in pump for remote sampling, backlit display, rechargeable battery, 90 db audible and visual alarm, optional external vibrating and audible alarms |
| Methane Detector | MDU420 | Industrial Scientific | www.indsci.com | Infrared methane sensor measures up to 100% methane, does not require oxygen to measure, |

| | |
|---|---|
| | backlight, audible and visual alarms, continuous monitoring capability |

SCBA: Self Contained Breathing Apparatus
CCBA: Closed Circuit Breathing Apparatus
CABA: Compressed Air Breathing Apparatus
SCSR: Self Contained Self Rescue
FSR: Filter Self Rescue
LEL: Lower Explosive Level
IS: Intrinsically Safe
PLC: Programmable Logical Control Example Vision/Guidance Systems Product List

| Model | Mfr. | Resolution | Battery Type | Battery Life | Charging Time | Wt. (lbs) |
|---|---|---|---|---|---|---|
| 4 HR320 | Argus | 320 × 240 | Ni-MH recharge | 4 hours | 2 hours | 3.3 |
| 4 | Argus | 160 × 120 | Ni-MH recharge | 4 hours | 2 hours | 3.3 |
| 4Lite | Argus | 160 × 120 | Ni-MH recharge | U | U | 3.3 |
| Eagle X | Eagle | 160 × 120 | Ni-MH recharge | U | 2 hours | 2.6 |
| Eagle Imager 160 | Eagle | U | 9 V Ni-MH recharge | U | U | 4.2 |
| ISI 3500 | Avon | U | Ni-MH recharge | 4 hours | 2 hours | 3.8 |
| ISI Surveyor | ISI | 320 × 240 | U | 4 hours | U | 6.1 |
| 3200 | Drager | 320 × 240 | Li Ion recharge | 4 hours | U | 2.9 |
| 1600 | Drager | 160 × 120 | Li Ion recharge | 4 hours | U | 2.9 |
| Ex/Cam Std V | Hawk Imagers | U | 12 V | U | U | U |
| Ex/Cam Pro V | Hawk Imagers | U | 12 V | U | U | U |
| FireLidar | R.L. Associates | Lidar | U | U | U | U |

| Model | FOV vert × horiz (degrees) | Spectral Response (μm) | Display Size (ins.) | H × W × D (ins.) | Comments |
|---|---|---|---|---|---|
| 4 HR320 | 50 | 8 to 14 | 3.5 | 5.1 × 7.2 × 72 | Zoom x2, x4; 2 rechargeable battery packs, scene capture (photos), three levels of sensitivity, ambient and direct temp measurement, remote control, neck strap, USB port, end-user software |
| 4 | 50 | 8 to 14 | 3.5 | 5.1 × 7.2 × 72 | Zoom x2; 2 rechargeable battery packs, scene capture (photos), three levels of sensitivity, ambient and direct temp measurement, remote control, neck strap, USB port, end-user software |
| 4Lite | 50 | 7 to 14 | 3.5 | 5.1 × 7.2 × 72 | Tri mode sensitivity for temp range performance |

-continued

| | | | | | |
|---|---|---|---|---|---|
| Eagle X | 54 × 44 | U | 3.5 | U | Image on-demand trigger to save battery life, optional AA speed loader (battery), optional truck charging station, |
| Eagle Imager 160 | U | U | U | U | 2-channel wireless transmitter, designed for working with gloved hands, vertical or horizontal screen directions, allows for virtual hands-free use, 2 button control, screen tilt makes it easy to view while crawling, etc |
| ISI 3500 | 50 × 35 | 8 to 14 | 3.5 | 5.25 × 6.25 × 8 | One button operation, binocular style design, neck strap, short lanyard or retractable lanyard options, two rechargeable batteries |
| ISI Surveyor | 59-Diagonal | U | U | U | Fixed focus, 2 rechargeable batteries, can superimpose a video on the image to enhance, wireless video transmission - single channel video link plus or dual channel 2.4, truck mount. |
| 3200 | 54 | 7 to 14 | | 5.6 × 5.5 × 7 | 2x zoom |
| 1600 | 54 | 7 to 14 | | 5.6 × 5.5 × 8 | |
| Ex/Cam Std V | 11, 17, or 32 | Longwave | needs separate monitor | U | NOT HANDHELD, flameproof, and FM & ATEX certified as explosion proof for gas and dust, Zoom 1.5, 3.5, 5.5 |
| EX/Cam Pro V | 11, 17, or 32 | Longwave | needs separate monitor | U | NOT HANDHELD, flameproof, and FM & ATEX certified as explosion proof for gas and dust |
| FireLidar | U | U | U | U | |

| Mfr. | Model | Tech Type | Typical Use | IS/ XP | Sensor Dimensions (H × W × D inches) | In Cab Unit Type | Range (ft) |
|---|---|---|---|---|---|---|---|
| Preco | Xtreme PreView | Pulse Radar | Surface Mining | N | 7.6  7.4  2.4 | LED and alarm | 32 |
| Preco | Standard PreView | Pulse Radar | Surface Mining | N | —  5.3 diam  1.4 | LED and alarm | 20 |
| Preco | High Resolution View | Pulse Radar | Surface Mining | N | 4.1  5  1.7 | LED and alarm | 20 |
| Sense Techs Inc. | Guardian Alert | Doppler Radar | Cars rear warning system | N | 2  2  U | LED and alarm | 32 |
| Senix | Ultrasonic Sensors | Ultrasonic | Proxim. Detect. | N | U  U  U | Comp. | 50 |
| Velodyne | HD(L) | Lidar | U | N | 10  8 diam  — | — | 165 to 394 |

| Mfr. | Resolution (ft) | Freq. | Update Rate (Hz) | Comments |
|---|---|---|---|---|
| Preco | 3 | 5.8 GHz | 60 | |
| Preco | 3 | 5.8 GHz | 60 | |
| Preco | 3 | 6.3 GHz | 60 | |
| Sense Techs Inc. | U | U | U | |

-continued

| | | | | |
|---|---|---|---|---|
| Senix | 1.7 in. | 50, 75, 125, 225, (kHz) | 2 to 120 | |
| Velodyne | <1 in | NA | 5 to 15 | Output is 100 MBPS UDP Ethernet Packets |

U: Information unavailable

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system, for operation within a mine comprising:
   a mobile mine personnel carrier for providing post incident support to various locations within the mine;
   one or more memory units supported on the mobile mine personnel carrier; and
   one or more processing units supported on the mobile mine personnel carrier operable to:
     access life support data from one or more devices associated with a life support subsystem of the mobile mine personnel carrier, the life support subsystem being operable to provide breathable air to one or more passengers of the mobile mine personnel carrier, the life support data indicating a remaining level of air available via at least a portion of the life support subsystem;
     access guidance data from one or more guidance devices associated with a guidance subsystem of the mobile mine personnel carrier, each of the one or more guidance devices operable to detect entities within a detection range of the guidance device;
     initiate display in an integrated information display of at least a portion of the life support data and at least a portion of the guidance data, the integrated information display comprising a unified electronic display of the mobile mine personnel carrier.

2. The system of claim 1, wherein:
   the one or more devices associated with the life support subsystem comprise one or more atmospheric sensors operable to detect one or more gases, the accessed life support data comprising one or more readings indicating the presence of one or more gases from the one or more atmospheric sensors; and
   the integrated information display comprises an indication of at least a portion of the one or more readings from the one or more atmospheric sensors.

3. The system of claim 1, wherein the one or more processing units are operable to:
   access vehicle data from one or more devices associated with a chassis of the mobile mine personnel carrier, the vehicle data providing one or more indications of vehicle health, and
   initiate display in the integrated information display of at least a portion of the vehicle data from the one or more devices associated with the chassis.

4. The system of claim 1, wherein the one or more processing units are operable to:
   access navigation data from one or more navigation subsystems of the mobile mine personnel carrier; and
   initiate display in the integrated information display of at least a portion of the navigation data from the one or more navigation subsystems.

5. The system of claim 1, wherein the one or more processing units are operable to:
   access communication data from one or more communication subsystems of the mobile mine personnel carrier; and
   initiate display in the integrated information display of at least a portion of the communication data from the one or more communication subsystems.

6. The system of claim 1, wherein the one or more processing units are operable to initiate substantially simultaneous display in an integrated information display of the at least a portion of the life support data and the at least a portion of the proximity data.

7. The system of claim 1, wherein:
   the life support subsystem comprises a sensor operable to determine a remaining amount of breathable air for at least one breathable air supply; and
   the one or more processing units are operable to:
     determine a breathable air usage rate for the at least one breathable air supply; and
     determine, at a particular time and based on the breathable air usage rate and the remaining amount of breathable air at the particular time, an estimated remaining time until the breathable air from the at least one breathable air supply expires.

8. The system of claim 1, wherein the one or more guidance devices comprise one or more of the following:
   one or more infrared cameras, the guidance data comprising one or more infrared images; and
   one or more proximity sensors, the guidance data comprising proximity data.

9. A method of providing incident support within a mine comprising:
   accessing, by one or more processing units, life support data from one or more devices associated with a life support subsystem of a mobile mine personnel carrier, the life support subsystem being operable to provide breathable air to one or more passengers of the mobile mine personnel carrier, the life support data indicating a remaining level of air available via at least a portion of the life support subsystem;
   accessing, by the one or more processing units, guidance data from one or more guidance devices associated with a guidance subsystem of the mobile mine personnel carrier, each of the one or more guidance devices operable to detect entities within a detection range of the guidance device;
   initiating, by the one or more processing units, display in an integrated information display of at least a portion of the life support data and at least a portion of the guidance data, the integrated information display comprising a unified electronic display of the mobile mine personnel carrier.

10. The method of claim 9, wherein:
the one or more devices associated with the life support subsystem comprise one or more atmospheric sensors operable to detect one or more gases, the accessed life support data comprising one or more readings indicating the presence of one or more gases from the one or more atmospheric sensors; and
the integrated information display comprises an indication of at least a portion of the one or more readings from the one or more atmospheric sensors.

11. The method of claim 9, comprising:
accessing vehicle data from one or more devices associated with a chassis of the mobile mine personnel carrier, the vehicle data providing one or more indications of vehicle health, and
initiating display in the integrated information display of at least a portion of the vehicle data from the one or more devices associated with the chassis.

12. The method of claim 9, comprising:
accessing navigation data from one or more navigation subsystems of the mobile mine personnel carrier; and
initiating display in the integrated information display of at least a portion of the navigation data from the one or more navigation subsystems.

13. The method of claim 9, comprising:
accessing communication data from one or more communication subsystems of the mobile mine personnel carrier; and
initiating display in the integrated information display of at least a portion of the communication data from the one or more communication subsystems.

14. The method of claim 9, comprising initiating substantially simultaneous display in an integrated information display of the at least a portion of the life support data and the at least a portion of the proximity data.

15. The method of claim 9, wherein:
the life support subsystem comprises a sensor operable to determine a remaining amount of breathable air for at least one breathable air supply; and
the method comprises:
determining a breathable air usage rate for the at least one breathable air supply; and
determining, at a particular time and based on the breathable air usage rate and the remaining amount of breathable air at the particular time, an estimated remaining time until the breathable air from the at least one breathable air supply expires.

16. The method of claim 9, wherein the one or more guidance devices comprise one or more of the following:
one or more infrared cameras, the guidance data comprising one or more infrared images; and
one or more proximity sensors, the guidance data comprising proximity data.

17. A mobile mine personnel carrier, comprising:
a mobile chassis which facilitates access to various locations of the mine in order to provide support to personnel in a post incident condition;
an integrated information display supported on the chassis;
one or more processing units supported on the chassis being operable to:
access life support data from one or more devices associated with a life support subsystem of the mobile mine personnel carrier, the life support subsystem being operable to provide breathable air to one or more passengers of the mine personnel carrier, the life support data indicating a remaining level of air available via at least a portion of the life support subsystem;
access guidance data from one or more guidance devices associated with a guidance subsystem of the mine personnel carrier, each of the one or more guidance devices operable to detect entities within a detection range of the guidance device;
initiate display in the integrated information display of at least a portion of the life support data and at least a portion of the guidance data, the integrated information display comprising a unified electronic display of the mine personnel carrier.

18. The mobile mine personnel carrier of claim 17, wherein:
the one or more devices associated with the life support subsystem comprise one or more atmospheric sensors operable to detect one or more gases, the accessed life support data comprising one or more readings indicating the presence of one or more gases from the one or more atmospheric sensors; and
the integrated information display comprises an indication of at least a portion of the one or more readings from the one or more atmospheric sensors.

19. The mobile mine personnel carrier of claim 17, wherein the one or more processing units are operable to:
access vehicle data from one or more devices associated with the mobile chassis of the mobile mine personnel carrier, the vehicle data providing one or more indications of vehicle health, and
initiate display in the integrated information display of at least a portion of the vehicle data from the one or more devices associated with the mobile chassis.

20. The mobile mine personnel carrier of claim 17, wherein the one or more processing units are operable to:
access navigation data from one or more navigation subsystems of the mobile mine personnel carrier; and
initiate display in the integrated information display of at least a portion of the navigation data from the one or more navigation subsystems.

21. The mobile mine personnel carrier of claim 17, wherein the one or more processing units are operable to:
access communication data from one or more communication subsystems of the mobile mine personnel carrier; and
initiate display in the integrated information display of at least a portion of the communication data from the one or more communication subsystems.

22. The mobile mine personnel carrier of claim 17, wherein the one or more processing units are operable to initiate substantially simultaneous display in an integrated information display of the at least a portion of the life support data and the at least a portion of the proximity data.

23. The mobile mine personnel carrier of claim 17, wherein:
the life support subsystem comprises a sensor operable to determine a remaining amount of breathable air for at least one breathable air supply; and
the one or more processing units are operable to: determine a breathable air usage rate for the at least one breathable air supply; and
determine, at a particular time and based on the breathable air usage rate and the remaining amount of breathable air at the particular time, an estimated remaining time until the breathable air from the at least one breathable air supply expires.

24. The mobile mine personnel carrier of claim 17, wherein the one or more guidance devices comprise one or more of the following:

one or more infrared cameras, the guidance data comprising one or more infrared images; and
one or more proximity sensors, the guidance data comprising proximity data.

* * * * *